(12) United States Patent
Haggerty et al.

(10) Patent No.: US 8,442,886 B1
(45) Date of Patent: May 14, 2013

(54) SYSTEMS AND METHODS FOR IDENTIFYING FINANCIAL RELATIONSHIPS

(75) Inventors: Kathleen Haggerty, Staten Island, NY (US); Venkat Varadachary, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 13/403,746

(22) Filed: Feb. 23, 2012

(51) Int. Cl.
*G06Q 40/00* (2012.01)
*G06Q 40/02* (2012.01)

(52) U.S. Cl.
USPC .............................................. 705/35; 705/38

(58) Field of Classification Search .................... 705/35, 705/37
See application file for complete search history.

(56) References Cited

U.S. PATENT DOCUMENTS

| | | | |
|---|---|---|---|
| 5,930,774 A | 7/1999 | Chennault | |
| 5,966,699 A | 10/1999 | Zandi | |
| 6,026,398 A | 2/2000 | Brown | |
| 6,105,001 A | 8/2000 | Masi et al. | |
| 6,119,103 A * | 9/2000 | Basch et al. | 705/35 |
| 6,128,599 A | 10/2000 | Walker et al. | |
| 6,249,770 B1 | 6/2001 | Erwin et al. | |
| 6,324,524 B1 | 11/2001 | Lent et al. | |
| 6,430,539 B1 | 8/2002 | Lazarus et al. | |
| 6,658,412 B1 | 12/2003 | Jenkins et al. | |
| 7,076,462 B1 * | 7/2006 | Nelson et al. | 705/38 |
| 7,552,074 B2 * | 6/2009 | Bruce et al. | 705/35 |
| 7,647,344 B2 | 1/2010 | Skurtovich et al. | |
| 7,657,540 B1 | 2/2010 | Bayliss | |
| 7,665,657 B2 * | 2/2010 | Huh | 235/379 |
| 7,716,125 B2 | 5/2010 | Shavit et al. | |
| 7,788,152 B2 | 8/2010 | Haggerty et al. | |
| 7,792,715 B1 | 9/2010 | Kasower | |
| 7,890,420 B2 | 2/2011 | Haggerty et al. | |
| 7,912,842 B1 | 3/2011 | Bayliss | |
| 7,912,865 B2 | 3/2011 | Akerman et al. | |
| 7,945,512 B2 * | 5/2011 | Scipioni et al. | 705/39 |
| RE42,663 E | 8/2011 | Lazarus et al. | |
| 8,001,153 B2 | 8/2011 | Skurtovich et al. | |

(Continued)

FOREIGN PATENT DOCUMENTS

| | | |
|---|---|---|
| JP | 2001282957 | 10/2001 |
| JP | 2002163449 | 6/2002 |

(Continued)

OTHER PUBLICATIONS http://kewaneecreditbureau.com/Credit.Trends.pdf; , Aug. 2000, pp. 1-4.

(Continued)

*Primary Examiner* — Jagdish Patel
(74) *Attorney, Agent, or Firm* — Snell & Wilmer L.L.P.

(57) ABSTRACT

Improved systems and methods are provided for identifying financial relationships. In particular, financial relationships may be identified by associating tradelines with one or more people who sign or co-sign on the tradeline. In various embodiments a method is provided comprising, receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, and linking, by the computer-based system, the tradeline with the primary debtor data and the secondary debtor data.

20 Claims, 25 Drawing Sheets

2400

U.S. PATENT DOCUMENTS

| | | | |
|---|---|---|---|
| 8,065,264 | B1 | 11/2011 | Achanta |
| 8,239,250 | B2 | 8/2012 | Kalia et al. |
| 8,266,168 | B2 | 9/2012 | Bayliss |
| 8,275,770 | B2 | 9/2012 | Bayliss |
| 8,326,712 | B2 | 12/2012 | Deliwala et al. |
| 2001/0054022 | A1 | 12/2001 | Louie et al. |
| 2002/0029188 | A1 | 3/2002 | Schmid |
| 2002/0052884 | A1 | 5/2002 | Farber et al. |
| 2002/0073099 | A1 | 6/2002 | Gilbert et al. |
| 2002/0077964 | A1 | 6/2002 | Brody et al. |
| 2002/0123960 | A1 | 9/2002 | Ericksen |
| 2002/0143661 | A1 | 10/2002 | Tumulty et al. |
| 2002/0178096 | A1 | 11/2002 | Marshall |
| 2002/0198688 | A1 | 12/2002 | Feldman |
| 2003/0004865 | A1 | 1/2003 | Kinoshita |
| 2003/0009368 | A1 | 1/2003 | Kitts |
| 2003/0018549 | A1 | 1/2003 | Fei et al. |
| 2003/0046223 | A1 | 3/2003 | Crawford et al. |
| 2003/0130878 | A1 | 7/2003 | Kruk et al. |
| 2003/0171942 | A1 | 9/2003 | Bayliss |
| 2004/0002916 | A1 | 1/2004 | Timmerman et al. |
| 2004/0034570 | A1 | 2/2004 | Davis |
| 2004/0107123 | A1 | 6/2004 | Haffner et al. |
| 2004/0177030 | A1 | 9/2004 | Shoham |
| 2004/0177036 | A1 | 9/2004 | Nutahara et al. |
| 2005/0125334 | A1 | 6/2005 | Masella et al. |
| 2005/0262014 | A1 | 11/2005 | Fickes |
| 2006/0004654 | A1 | 1/2006 | Kornegay et al. |
| 2006/0155624 | A1 | 7/2006 | Schwartz |
| 2006/0229943 | A1 | 10/2006 | Mathias et al. |
| 2006/0282356 | A1 | 12/2006 | Andres et al. |
| 2007/0011026 | A1 | 1/2007 | Higgins et al. |
| 2007/0055598 | A1 | 3/2007 | Arnott et al. |
| 2007/0244779 | A1* | 10/2007 | Wolff .............................. 705/35 |
| 2007/0265957 | A1 | 11/2007 | Advani et al. |
| 2008/0033852 | A1 | 2/2008 | Megdal et al. |
| 2009/0006245 | A1* | 1/2009 | Rabson ........................... 705/38 |
| 2010/0094910 | A1 | 4/2010 | Bayliss |
| 2011/0078011 | A1 | 3/2011 | Senghore et al. |
| 2011/0276471 | A1 | 11/2011 | Haggerty et al. |
| 2012/0046979 | A1 | 2/2012 | Chatterji et al. |
| 2012/0109734 | A1 | 5/2012 | Fordyce et al. |
| 2012/0123968 | A1 | 5/2012 | Megdal et al. |
| 2012/0136763 | A1 | 5/2012 | Megdal et al. |
| 2012/0185296 | A1 | 7/2012 | Haggerty et al. |
| 2012/0185297 | A1 | 7/2012 | Chatterji et al. |
| 2012/0221452 | A1 | 8/2012 | Haggerty et al. |

FOREIGN PATENT DOCUMENTS

| | | |
|---|---|---|
| JP | 2003316950 | 11/2003 |
| WO | 0116896 | 3/2001 |
| WO | 0139090 | 5/2001 |
| WO | 0180053 | 10/2001 |

OTHER PUBLICATIONS

AISG's National Underwriting Database, A-PLUS, is Now the Largest in the Industry, Business Wire, Aug. 7, 1997, pp. 1-2.

Credit Risk Management Report, Potomac, Mar. 9, 1998, vol. 8, Iss. 4, pp. 1-2.

Dataman Group web page from Aug. 22, 2001; http://web.archive.org/web/20010822113446/http://www.datamangroup.com/summarized_credit.asp (1 of 2) on Sep. 14, 2010 10:48:45 AM , 2 pages.

Internal Revenue Service Data Book 2000, Issued Aug. 2001, Revised May 2003, pp. 1-56.

GAO-03-661 Best Practices Improved Knowledge of DOD Service Contracts Could Reveal Significant Savings, GAO, Jun. 2003, pp. 1-45.

DOE/EIA-M065(2004, Model Documentation Report: Macroeconomic Activity Module (MAM) of the National Energy Modeling System, EIA, U.S. Department of Energy, Washington DC, Feb. 2004, pp. 1-B33.

"Balance Transfers Offer Opportunities, Risk Credit Management Report" Jan. 29, 1996, vol. 6, Issue 2, Phillips Business Information—Newsletter, pp. 1-3.

"Credit Trends," Experian Information Solutions, Inc., Aug. 2000, pp. 1-4.

USPTO; All Office Actions (Non-Final, Final, Advisory Actions, Restrictions/Elections, etc.), Notices of Allowance, from U.S. Appl. Nos. 11/497,563; 11/497,521; 12/833,708; 11/497,529; 11/497,530; 11/497,562; 12/833,741; 12/909,645; 13/170,006; 11/497,527; 11/586,728; 11/586,737; 12/103,418; 12/103,403. 12/103,394; 13/165,627; 11/169,588; 13/032,427; 12/984,801; 12/904,732; 11/169,778; 11/169,664; 11/615,747.

USPTO; All Office Actions (Non-Final, Final, Advisory Actions, Restrictions/Elections, etc.), Notices of Allowance, from U.S. Appl. Nos. 11/611,699; 11/608,179; 13/209,035; 13/274,029; 12/180,256; 12/144,506; 13/274,046; 10/978,298; 12/777,030; 11/169,769; 12/368,817; 12/368,799; 11/169,779; 13/286,884; 13/302,921; 13/356,270.

MX; Office Action dated Aug. 17, 2011 in Application No. MX/a/2008/001717.

Examiner's Report No. 4, for Australian Application No. 2006285253, dated Jan. 27, 2011.

JP; Office Action dated Nov. 26, 2010 in Application No. 2008-525214.

Examiner's Report No. 3, for Australian Application No. 2006285253, dated Oct. 28, 2010.

Examiner's Report No. 2, for Australian Application No. 2006285253, dated Aug. 11, 2010.

Examiner's Report No. 1, for Australian Application No. 2006285253, dated Jul. 27, 2009.

IPRP for PCT Appln. No. PCT/US07/25964 dated Jun. 24, 2009.

Examiner's Report No. 5, for Australian Application No. 2006285253, dated Apr. 8, 2011.

MX; Office Action dated Jun. 17, 2011 in Application No. MX/a/2007/012294.

Cantor, R. and Packer, F., "The Credit Rating Industry," FRBNY Quarterly Review, Summer-Fall, 1994, pp. 1-24.

AISG's National Underwriting Database, A-PLUS, is Now the Largest in the Industry, Business Wire, Aug. 7, 1997.

Alexander David, "Controlling Information Premia by Repackaging Asset-Backed Securities," The Journal of Risk and Insurance, Dec. 1997, 26 pages.

Industry Briefs Credit Risk Management Report, Potomac, Mar. 9, 1998, vol. 8, Iss. 4.

Dataman Group web page from Aug. 22, 2001; http://web.archive.org/web/20010822113446/http://www.datamangroup.com/summarized_credit.asp (1 of 2) on Sep. 14, 2010 10:48:45 AM.

comScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.

Internal Revenue Service Data Book 2000, Issued Aug. 2001, Revised May 2003.

GAO-03-661 Best Practices Improved Knowledge of DOD Service Contracts Could Reveal Significant Savings, GAO, Jun. 2003.

DOE/EIA-M065(2004, Model Documentation Report: Macroeconomic Activity Module (MAM) of the National Energy Modeling System, EIA, U.S. Department of Energy, Washington DC, Feb. 2004.

Saunders, A., "Data Goldmine," Management Today, London: Mar. 2004, 6 pages.

Fair Isaac Announces Integrated, End-to-End Collection and Recovery Solution, Business Wire, New York, Sep. 2, 2004, p. 1.

Chen, Yuxin et al., "Modeling Credit Card 'Share of Wallet': Solving the Incomplete Information Problem," New York University: Kaufman Management Center, http://www.gsb.stanford.edu/facseminars/events/marketing/pdfs/F2004_10-27_Chen.pdf, Oct. 27, 2004, 48 pages.

Verstraeten, Geed, Ph.D.; Issues in predictive modeling of individual customer behavior: Applications in targeted marketing and consumer credit scoring; Unversiteit Gent (Belgium) 2005, pp. 1 and 2.

William R. Dillon, John B. White, Vithala R. Rao, and Doug Filak; "Good Science"; Marketing Research; vol. 9, Iss. 4; Winter 1997; pp. 1-11.

Srikanta Chatterjee, Claudio Michelini, and Ranjan Ray; "Expenditure Patterns and Aggregate Consumer Behavior; Some Experiments with Australian and New Zealand Data"; The Economic Record, vol. 70, No. 210; Sep. 1994; pp. 278-291.

Jost, Allen; Credit World, v81, n4; Neural networks; Mar./Apr. 1993; pp. 1-9.
American Banker; "AT&T Expected to Turn Up Heat in Card Wars"; vol. 158, No. 101; May 27, 1993; pp. 1-3.
Credit Card Management; "Neural Nets Shoot for Jackpot"; Dec. 1995; pp. 1-6.
Bank Technology News; "The Road to Better Credit-Card Marketing"; Sep. 1995; pp. 1-4.
http://kewaneecreditbureau.com/Credit.Trends.pdf.
Wyatt, Craig, "Usage models just for merchants," Credit Card Management vol. 8, Iss. 6, Sep. 1995, pp. 1-4.
Fickenscher, Lisa, "Merchant American Express Seeks to Mine its Data on Cardholder Spending Patterns," American Banker, vol. 162, Issue 56, Mar. 24, 1997, pp. 1-2.
International Search Report for Int'l Appln. No. PCT/US06/30384 dated Dec. 26, 2006.
Written Opinion for PCT Appln. No. PCT/US06/30384 dated Dec. 26, 2006.
International Search Report for Int'l Appln. No. PCT/US06/25569 dated Mar. 28, 2007.
Written Opinion for PCT Appln. No. PCT/US06/25569 dated Mar. 28, 2007.
IPRP for PCT Appln. No. PCT/US06/30384 dated Oct. 22, 2007.
IPRP for PCT Appln. No. PCT/US06/25569 dated Jan. 9, 2008.
International Search Report for Int'l Appln. No. PCT/US07/25964 dated Apr. 8, 2008.
Written Opinion for PCT Appln. No. PCT/US07/25964 dated Apr. 8, 2008.
International Search Report for PCT Application No. PCT/US07/25574 dated May 9, 2008.
Written Opinion for PCT Application No. PCT/US07/25574 dated May 9, 2008.
IPRP for PCT Application No. PCT/US07/25574 dated Jun. 16, 2009.
"Balance Transfers Offer Opportunities, Risk Credit Management Report" Jan. 29, 1996, vol. 6, Issue 2, Phillips Business Information—Newsletter.
"Credit Trends," Experian Information Solutions, Inc., Aug. 2000.
Card Marketing; "Card companies tap credit bureaus for data streams (Experian (Orange, CAI hopes to develop data mining tools to track the 'emerging consumer', such as start-up business and immigrant populations)"; Feb. 1998; pp. 1 and 2.
American Banker; "Eyes on Credit Software to Predict Bankruptcies in Demand (Companies that help identify consumers at risk of declaring bankruptcy are doing a booming business; some 1,350,118 peoplse filed for bankruptcy in 1998, up 95% over 1990 levels)"; Mar. 4, 1999; pp. 1 and 2.
Wright, D.; "Comparative evaluation of electronic payment systems"; Feb. 2002; p. 1.
Taiwan: Plastic Money Frims Break New Ground; "Plastic money turns to enterprise market"; Apr. 7, 1995; p. 1.
Messmer, Ellen; Network World; "Firm taps B2B e-comm to boost customer service. Company Business and Marketing"; Feb. 7, 2000; pp. 1 and 2.
American Banker; "Amex Offers Small-Firm Card With Built-in Spending Limits"; Jul. 31, 1995; p. 1.
Kim Namwoon; "Using Market Diffusion Models for Developing and Assessing Marketing Strategies (Technical Products)"; 1993; p. 1.
Bertrand Marotte; "powerful eye mines the depths of consumer spending: Bertrand Marotte explains how companies use information on your purchases to their advantage—and even your disadvantage.; [Final Edition]"; Jan. 14, 1998; pp. 1 and 2.
USPTO; All Office Actions (Non-Final, Final, Advisory Actions, Restrictions/Elections, etc.), Notices of Allowance, from U.S. Appl. Nos. 13/403,634; 13/403,651; 13/403,680; 13/403,700; 13/403,728; 13/403,736; 13/403,752; 13/403,768; 13/403,778.
Examiner's Report received Jan. 24, 2012 in Canadian Application No. 2,592,944.
Advisory Action dated Feb. 22, 2012 in U.S. Appl. No. 11/608,179.
Notice of Allowance dated Feb. 23, 2012 in U.S. Appl. No. 13/302,921.
Notice of Allowance dated Feb. 29, 2012 in U.S. Appl. No. 11/611,699.
Notice of Allowance dated Apr. 4, 2012 in U.S. Appl. No. 11/608,179.
Final Office Action dated Apr. 16, 2012 in U.S. Appl. No. 13/209,035.
Office Action dated Apr. 12, 2012 in U.S. Appl. No. 13/286,884.
Examiner's Report dated Apr. 2, 2012 in Canadian Application No. 2,617,798.
Office Action dated May 7, 2012 in U.S. Appl. No. 13/032,427.
Office Action dated May 11, 2012 in U.S. Appl. No. 11/169,778.
Office Action dated May 14, 2012 in U.S. Appl. No. 13/356,270.
Office Action dated May 30, 2012 in U.S. Appl. No. 13/170,006.
Notice of Allowance dated Jun. 6, 2012 in U.S. Appl. No. 13/286,884.
Office Action received Jun. 12, 2012 in Mexican Application No. MX/a/2008/001717.
Office Action dated Jun. 14, 2012 in U.S. Appl. No. 13/432,890.
Office Action dated Jun. 14, 2012 in U.S. Appl. No. 12/144,506.
Notice of Allowance dated Jun. 22, 2012 in U.S. Appl. No. 13/170,006.
Office Action dated Jun. 26, 2012 in U.S. Appl. No. 12/984,801.
Advisory Action dated Jun. 27, 2012 in U.S. Appl. No. 13/209,035.
Office Action Action dated Jun. 27, 2012 in U.S. Appl. No. 12/465,837.
Office Action received Jun. 28, 2012 in Mexican Application No. MX/a/2007/012294.
Notice of Allowance dated Jul. 6, 2012 in U.S. Appl. No. 13/356,270.
Notice of Allowance dated Jul. 25, 2012 in U.S. Appl. No. 13/465,837.
Final Office Action dated Aug. 6, 2012 in U.S. Appl. No. 11/497,530.
Office Action dated Aug. 17, 2012 in U.S. Appl. No. 13/480,910.
Notice of Allowance dated Sep. 6, 2012 in U.S. Appl. No. 13/432,941.
Notice of Allowance dated Sep. 21, 2012 in U.S. Appl. No. 13/570,120.
Office Action dated Aug. 6, 2012 in U.S. Appl. No. 13/432,941.
Notice of Allowance dated Oct. 1, 2012 in U.S. Appl. No. 12/984,801.
Office Action dated Oct. 1, 2012 in U.S. Appl. No. 11/169,664.
Office Action dated Oct. 4, 2012 in U.S. Appl. No. 13/538,936.
Notice of Allowance dated Oct. 11, 2012 in U.S. Appl. No. 11/497,530.
Notice of Allowance dated Oct. 24, 2012 in U.S. Appl. No. 11/497,529.
Notice of Allowance dated Nov. 13, 2012 in U.S. Appl. No. 13/538,936.
Office Action dated Nov. 16, 2012 in U.S. Appl. No. 13/403,651.
Final Office Action dated Nov. 21, 2012 in U.S. Appl. No. 11/169,778.
Office Action dated Nov. 26, 2012 in U.S. Appl. No. 13/032,427.
Notice of Allowance dated Nov. 29, 2012 in U.S. Appl. No. 13/432,890.
Office Action dated Oct. 17, 2012 in U.S. Appl. No. 13/209,035.
Office Action received Feb. 15, 2013 in Mexican Application No. MX/a/2008/001717.
Final Office Action dated Jan. 15, 2013 in U.S. Appl. No. 13/432,968.
Final Office Action dated Jan. 22, 2013 in U.S. Appl. No. 12/144,506.
Advisory Action dated Jan. 29, 2013 in U.S. Appl. No. 13/403,778.
Final Office Action dated Jan. 29, 2013 in U.S. Appl. No. 11/169,664.
Notice of Allowance dated Jan. 30, 2013 in U.S. Appl. No. 13/432,968.
Office Action dated Jan. 31, 2013 in U.S. Appl. No. 13/403,634.
Notice of Allowance dated Feb. 1, 2013 in U.S. Appl. No. 13/480,910.
Office Action Restriction dated Feb. 6, 2013 in U.S. Appl. No. 13/622,957.
Office Action dated Mar. 1, 2013 in U.S. Appl. No. 11/586,737.
Office Action dated Mar. 7, 2013 in U.S. Appl. No. 13/403,736.
Notice of Allowance dated Mar. 11, 2013 in U.S. Appl. No. 13/622,957.

* cited by examiner

| From Experian TrendView | | | From ComScore Data | | | |
| --- | --- | --- | --- | --- | --- | --- |
| Balance 3 | Balance 2 | Balance 1 | Purchase Volume | Last Payment | Previous balance | New Balance |
| 219 | 25 | 229 | 1465.47 | 1263.39 | 25.51 | 229.12 |
| 37 | 2 | 566 | 1187.14 | 650.64 | 2.64 | 566.11 |
| 6928 | 9192 | 27 | 10162.2 | 19354.84 | 9192.55 | 27.56 |
| 1434 | 32 | 54 | 1021.95 | 1000 | 32.05 | 54 |

|  |  | Predicted Paydown Percent | | | | |
|---|---|---|---|---|---|---|
|  |  | <5% | 5-20% | 20-50% | 50%-80% | 80%+ |
| Actual paydown percent | <5% | 55604 | 12230 | 1359 | 31 | 0 |
|  | 5-20% | 1314 | 5422 | 2282 | 54 | 1 |
|  | 20-50% | 64 | 429 | 1835 | 333 | 13 |
|  | 50%-80% | 1 | 41 | 492 | 301 | 53 |
|  | 80%+ | 0 | 22 | 534 | 1236 | 429 |

|  |  | Prediction | |
|---|---|---|---|
|  |  | Revolver | Transactor |
| Actual | Revolver | 80539 | 432 |
|  | Transactor | 1090 | 2019 |

|  |  | Predict | |
|---|---|---|---|
|  |  | No BT in | BT in |
| Actual | No BT in | 148,326 | 6,526 |
|  | BT in | 9,534 | 9,832 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 98,483 | 8,611 | 1,818 | 727 | 200 |
| | $500-1000 | 3,863 | 10,658 | 3,210 | 651 | 87 |
| | $1000-2000 | 2,220 | 2,474 | 7,192 | 2,727 | 245 |
| | $2000-5000 | 2,457 | 1,373 | 4,390 | 11,197 | 1,236 |
| | >$5000 | 520 | 336 | 1,011 | 3,512 | 5,020 |

| Dollar Figure | | Predicted Spending | | | | |
|---|---|---|---|---|---|---|
| | | <$500 | $500-1000 | $1000-2000 | $2000-5000 | >$5000 |
| Actual Spending | <$500 | 116,821 | 7,388 | 2,521 | 1,269 | 98 |
| | $500-1000 | 6,118 | 15,455 | 6,908 | 1,635 | 70 |
| | $1000-2000 | 3,074 | 8,383 | 31,477 | 5,794 | 181 |
| | $2000-5000 | 826 | 2,200 | 9,052 | 36,441 | 797 |
| | >$5000 | 7 | 19 | 95 | 838 | 2,880 |

|  |  | Predicted Average Monthly Spending | | | | |
|---|---|---|---|---|---|---|
|  |  | <$500 | $500-1000 | $1000-2000 | $2000-5000 | >$5000 |
| Actual Spending | <$500 | 524,328 | 36,853 | 9,116 | 3,083 | 481 |
|  | $500-1000 | 25,942 | 104,009 | 17,292 | 3,304 | 280 |
|  | $1000-2000 | 8,478 | 20,132 | 82,363 | 10,722 | 583 |
|  | $2000-5000 | 3,574 | 4,125 | 15,852 | 57,077 | 2,250 |
|  | >$5000 | 557 | 399 | 1,184 | 4,624 | 8,323 |

| Rank Order | | Predicted Spending | |
|---|---|---|---|
|  |  | below 10% (< $1950) | top 10% (> $1950) |
| Actual Spending | below 10% (< $2050) | 827,716 | 22,721 |
|  | top 10% (> $2050) | 22,721 | 71,773 |

|  |  | Predicted Annual Total Spending | | | |
|---|---|---|---|---|---|
|  |  | <$10K | $10K-20K | $20-50K | >$50K |
| Actual Annual Total Spending | <$10K | 656,404 | 34,314 | 6,528 | 340 |
| | $10K-20K | 31,931 | 67,143 | 12,818 | 170 |
| | $20-50K | 3,390 | 21,242 | 68,009 | 1,715 |
| | >$50K | 112 | 582 | 7,525 | 9,018 |

| Rank Order | | Predicted Annual Total Spending | | | |
|---|---|---|---|---|---|
| | | Below top 20% (<$13K) | Top 10-20% ($13K-21.5K) | Top 5-10% ($21.5K-30.4K) | Top 5% (>$30.4K) |
| Actual Annual Total Spending | Below top 20% (<$13K) | 720,180 | 24,610 | 5,334 | 2,629 |
| | Top 10-20% ($13K-22.5K) | 27,336 | 51,082 | 7,477 | 2,366 |
| | Top 5-10% ($22.5K-32.9K) | 3,994 | 13,907 | 22,778 | 4,182 |
| | Top 5% (>$32.9K) | 1,483 | 4,525 | 11,473 | 37,885 |

FIG. 19

| HH Type | HH Size | Household Mix |||Percent of HH |
|---|---|---|---|---|---|
| | | Basic | Supp | Prospect | |
| 1 | 1 | 1 | 0 | 0 | 23% |
| 2A | 2 | 2 | 0 | 0 | 5% |
| 2B | 2 | 1 | 1 | 0 | 20% |
| 2C | 2 | 1 | 0 | 1 | 19% |
| 3A | 3 | 1 | 0 | 2 | 8% |
| 3B | 3 | 1 | 1 | 1 | 7% |
| 3C | 3 | 2 | 0 | 1 | 2% |
| 3D | | | Other | | 2% |
| 4 | 4 | | All | | 13% |

SYSTEMS AND METHODS FOR IDENTIFYING FINANCIAL RELATIONSHIPS

FIELD

This disclosure generally relates to financial data processing, and in particular it relates to identifying and analyzing financial relationships.

BACKGROUND

Financial relationships amongst people arise for a variety of reasons. Married couples tend to have a financial relationship which may include joint and several liability with respect to debt obligations (e.g., mortgage loans, automobile loans, and transaction accounts). Parents may co-sign or guarantee debt obligations of their children, especially when the children are young adults. Siblings may also have mutual debt obligations, such as a mortgage loan on an investment property. Financial relationships tend to be strongest when the borrowers reside in the same physical location, though strong financial relationships exist amongst people who do not reside in the same physical location. In these situations, and others, credit issuers may desire a more detailed analysis of a consumer's financial relationships. However, credit bureaus are not able to accomplish this as the co-signer(s) of a tradeline is/are not necessarily retained in credit bureau records. Thus, there is a need for systems and methods to identify and analyze financial relationships, such as those financial relationships that include a shared tradeline.

SUMMARY

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, and linking, by the computer-based system, the tradeline with the primary debtor data and the secondary debtor data. In various embodiments the method further comprises determining whether the primary debtor and the secondary debtor reside at the same physical address In various embodiments a method is provided comprising a non-transitory memory communicating with a processor, the non-transitory memory having instructions stored thereon that, in response to execution by the processor, cause the processor to perform operations comprising receiving, by the processor, credit reporting data relating to a tradeline, and parsing, by the processor, the credit reporting data to yield primary debtor data and secondary debtor data and linking, by the processor, the tradeline with the primary debtor data and the secondary debtor data. In various embodiments the method further comprises linking, by the computer-based system, the tradeline data with the primary debtor and the secondary debtor in the data store In various embodiments a method is provided comprising identifying, by a computer-based system for credit data analysis comprising a processor and a tangible, non-transitory memory, tradeline data associated with a primary debtor in a data store containing credit bureau data, combining, by the computer-based system, a subset of the tradeline data using a fingerprinting function to yield a tradeline fingerprint, querying, by the computer-based system, the data store for the tradeline fingerprint to retrieve a secondary debtor associated with the tradeline fingerprint. In various embodiments the method further comprises wherein a credit score is derived from the household tradeline data set and the making a credit approval decision is further made based upon the credit score In various embodiments a method is provided comprising a non-transitory memory communicating with a processor, the non-transitory memory having instructions stored thereon that, in response to execution by the processor, cause the processor to perform operations comprising identifying, by the processor, tradeline data associated with a primary debtor in a data store containing credit bureau data, combining, by the processor, a subset of the tradeline data using a fingerprinting function to yield a tradleine fingerprint, querying, by the processor, the data store for the tradleine fingerprint to retrieve a secondary debtor associated with the tradeline fingerprint.

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data identifies a primary debtor and wherein the secondary debtor data identifies a secondary debtor, linking, by the computer-based system, the tradeline with the primary debtor data and the secondary debtor data, wherein the linking causes the tradeline to be associated with the primary debtor and the secondary debtor, querying, by the computer-based system, the data store for tradelines associated with the primary debtor and the secondary debtor, wherein the querying yields a household tradeline data set, marketing at least one of a product and service based upon at least one of the household tradeline data set, the primary debtor data and the secondary debtor data.

In various embodiments a method is provided comprising identifying, by a computer-based system for credit data analysis comprising a processor and a tangible, non-transitory memory, tradeline data associated with a primary debtor in a data store containing credit bureau data, combining, by the computer-based system, a subset of the tradeline data using a fingerprinting function to yield a tradeline fingerprint querying, by the computer-based system, the data store for the tradeline fingerprint to retrieve a secondary debtor associated with the tradeline fingerprint querying, by the computer-based system, the data store for primary debtor data relating to the primary debtor and secondary debtor data relating to the secondary debtor querying the data store for tradelines associated the primary debtor and the secondary debtor, wherein the querying yields a household tradeline data set, and marketing at least one of a product and service based upon at least one of the household tradeline data set, the primary debtor data and the secondary debtor data.

In various embodiments a method is provided comprising receiving, at a computer-based system for credit data analysis comprising a processor and a tangible, non-transitory memory, credit reporting data relating to a tradeline parsing, by the computer-based system, the credit reporting data to yield primary debtor data and secondary debtor data, wherein the primary debtor data identifies a primary debtor and wherein the secondary debtor data identifies a secondary debtor, linking, by the computer-based system, the tradeline with the primary debtor data and the secondary debtor data, wherein the linking causes the tradeline to be associated with the primary debtor and the secondary debtor, querying, by the computer-based system, the data store for tradelines associated with the primary debtor and the secondary debtor, wherein the querying yields a household tradeline data set, making a credit approval decision based upon the household tradeline data set.

In various embodiments a method is provided comprising identifying, by a computer-based system for credit data analysis comprising a processor and a tangible, non-transitory memory, tradeline data associated with a primary debtor in a data store containing credit bureau data, combining, by the computer-based system, a subset of the tradeline data using a fingerprinting function to yield a tradeline fingerprint, querying, by the computer-based system, the data store for the tradeline fingerprint to retrieve a secondary debtor associated with the tradeline fingerprint, querying, by the computer-based system, the data store for primary debtor data relating to the primary debtor and secondary debtor data relating to the secondary debtor, querying the data store for tradelines associated the primary debtor and the secondary debtor, wherein the querying yields a household tradeline data set, and making a credit approval decision based upon the household tradeline data set.

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data identifies a primary debtor and wherein the secondary debtor data identifies a secondary debtor, and wherein a debtor entity comprises the primary debtor and the secondary debtor, linking, by the computer-based system, the tradeline with the primary debtor data and the secondary debtor data, wherein the linking causes the tradeline to be associated with the primary debtor and the secondary debtor, querying, by the computer-based system, the data store for tradelines associated with the primary debtor and the secondary debtor, wherein the querying yields a household tradeline data set, identifying, by the computer-based system, any balance transfers within the household tradeline data set, discounting, by the computer-based system, the amount of the balance transfers from any spending identified in the household tradeline data set, and determining, by the computer-based system, a purchasing ability of the debtor entity based on the household tradeline data set, the discounting, and a model of consumer spending patterns In various embodiments a method is provided comprising identifying, by a computer-based system for credit data analysis comprising a processor and a tangible, non-transitory memory, tradeline data associated with a primary debtor in a data store containing credit bureau data, combining, by the computer-based system, a subset of the tradeline data using a fingerprinting function to yield a tradeline fingerprint, querying, by the computer-based system, the data store for the tradeline fingerprint to retrieve a secondary debtor associated with the tradeline fingerprint, querying, by the computer-based system, the data store for primary debtor data relating to the primary debtor and secondary debtor data relating to the secondary debtor, querying the data store for tradelines associated the primary debtor and the secondary debtor, wherein the querying yields a household tradeline data set, and identifying, by the computer-based system, any balance transfers within the household tradeline data set, discounting, by the computer-based system, the amount of the balance transfers from any spending identified in the household tradeline data set, and determining, by the computer-based system, a purchasing ability of the debtor entity based on the household tradeline data set, the discounting, and a model of consumer spending patterns derived from individual and aggregate consumer data.

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data identifies a primary debtor and wherein the secondary debtor data identifies a secondary debtor, and wherein a debtor entity comprises the primary debtor and the secondary debtor, linking, by the computer-based system, the tradeline with the primary debtor data and the secondary debtor data, wherein the linking causes the tradeline to be associated with the primary debtor and the secondary debtor, querying, by the computer-based system, the data store for tradelines associated with the primary debtor and the secondary debtor, wherein the querying yields a household tradeline data set, estimating, by the computer-based system, credit-related information of the debtor entity based on the household tradeline data set, a previous balance transfer, and a model of consumer spending patterns, wherein the credit-related information comprises a spend amount associated with the debtor entity, and offsetting, by the computer-based system, the previous balance transfers from the estimated credit-related information.

In various embodiments a method is provided comprising receiving, at a computer-based system for credit data analysis comprising a processor and a tangible, non-transitory memory, credit reporting data relating to a tradeline, wherein the credit reporting data is encapsulated in a Metro 2 format container, parsing, by the computer-based system, the credit reporting data to yield primary debtor data and secondary debtor data, linking, by the computer-based system, the tradeline with the primary debtor data and the secondary debtor data.

In various embodiments a method is provided comprising identifying, by a computer-based system for credit data analysis comprising a processor and a tangible, non-transitory memory, tradeline data associated with a primary debtor in a data store containing credit bureau data, wherein the tradeline data is associated with a tradeline, combining, by the computer-based system, a subset of the tradeline data using a fingerprinting function to yield a tradeline fingerprint, querying, by the computer-based system, the data store for the tradeline fingerprint to retrieve a secondary debtor associated with the tradeline fingerprint.

In various embodiments a method is provided comprising a non-transitory memory communicating with a processor, the non-transitory memory having instructions stored thereon that, in response to execution by the processor, cause the processor to perform operations comprising receiving, at the processor, credit reporting data relating to a tradeline, wherein the credit reporting data is encapsulated in a Metro 2 format container, parsing, by the processor, the credit reporting data to yield primary debtor data and secondary debtor data, linking, by the processor, the tradeline with the primary debtor data and the secondary debtor data.

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, linking, by the computer-based system, the tradeline with the primary debtor data and the secondary debtor data, and querying, by the computer-based system, a data store containing credit bureau data for a physical address associated with the primary debtor and a physical address associated with the secondary debtor, and determining, by the computer-based system, that the primary debtor and the secondary debtor reside at the different physical addresses.

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data identifies a primary debtor and wherein the secondary debtor data identifies a secondary debtor, and wherein a debtor entity comprises the primary debtor and the secondary debtor, linking, by the computer-based system, the tradeline with the primary debtor data and the secondary debtor data, wherein the linking causes the tradeline to be associated with the primary debtor and the secondary debtor, querying, by the computer-based system, a data store containing credit bureau data for a physical address associated with the primary debtor and a physical address associated with the secondary debtor, and determining, by the computer-based system, that the primary debtor and the secondary debtor reside at the different physical addresses.

In various embodiments a method is provided comprising, receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data is associated with a primary debtor and the secondary debtor data is associated with a secondary debtor and wherein a debtor entity comprises the primary debtor and the secondary debtor, and linking, by the computer-based system, the tradeline with the primary debtor data and the secondary debtor data, querying, by the computer-based system, a data store comprising credit bureau data to retrieve debtor entity tradeline data comprising tradeline data associated with at least one of the primary debtor and the secondary debtor.

In various embodiments a method is provided comprising identifying, by a computer-based system for credit data analysis comprising a processor and a tangible, non-transitory memory, tradeline data associated with a primary debtor in a data store containing credit bureau data, combining, by the computer-based system, a subset of the tradeline data using a fingerprinting function to yield a tradeline fingerprint, querying, by the computer-based system, the data store for the tradeline fingerprint to retrieve a secondary debtor associated with the tradeline fingerprint, wherein a debtor entity comprises the primary debtor and the secondary debtor, querying, by the computer-based system, the data store to retrieve debtor entity tradeline data comprising tradeline data associated with at least one of the primary debtor and the secondary debtor.

In various embodiments, a system is provided for credit data analysis comprising, a non-transitory memory communicating with a processor, the non-transitory memory having instructions stored thereon that, in response to execution by the processor, cause the processor to perform operations comprising, receiving, by the processor, credit reporting data relating to a tradeline, parsing, by the processor, the credit reporting data to yield primary debtor data and secondary debtor data, wherein the primary debtor data is associated with a primary debtor and the secondary debtor data is associated with a secondary debtor and wherein a debtor entity comprises the primary debtor and the secondary debtor, and linking, by the processor, the tradeline with the primary debtor data and the secondary debtor data, querying, by the processor, a data store comprising credit bureau data to retrieve debtor entity tradeline data comprising tradeline data associated with at least one of the primary debtor and the secondary debtor.

In various embodiments a method is provided comprising, receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data is associated with a primary debtor and the secondary debtor data is associated with a secondary debtor and wherein a debtor entity comprises the primary debtor and the secondary debtor, and linking, by the computer-based system, the tradeline with the primary debtor data and the secondary debtor data, querying, by the computer-based system, an internal data store to retrieve debtor entity internal data comprising internal data associated with at least one transaction account of at least one of the primary debtor and the secondary debtor.

In various embodiments a method is provided comprising identifying, by a computer-based system for credit data analysis comprising a processor and a tangible, non-transitory memory, tradeline data associated with a primary debtor in a data store containing credit bureau data combining, by the computer-based system, a subset of the tradeline data using a fingerprinting function to yield a tradeline fingerprint querying, by the computer-based system, the data store for the tradeline fingerprint to retrieve a secondary debtor associated with the tradeline fingerprint, wherein a debtor entity comprises the primary debtor and the secondary debtor, querying, by the computer-based system, an internal data store to retrieve debtor entity internal data comprising internal data associated with at least one transaction account of at least one of the primary debtor and the secondary debtor.

In various embodiments a method is provided comprising receiving, at a computer-based system for credit data analysis comprising a processor and a tangible, non-transitory memory, credit reporting data relating to a tradeline, parsing, by the computer-based system, the credit reporting data to yield primary debtor data and secondary debtor data, wherein the primary debtor data is associated with a primary debtor and the secondary debtor data is associated with a secondary debtor and wherein a debtor entity comprises the primary debtor and the secondary debtor, and linking, by the computer-based system, the tradeline with the primary debtor data and the secondary debtor data, querying, by the computer-based system, a data store comprising credit bureau data to retrieve debtor entity tradeline data including an installment tradeline, wherein the installment tradeline is associated with the primary debtor and the secondary debtor.

In various embodiments a method is provided comprising identifying, by a computer-based system for credit data analysis comprising a processor and a tangible, non-transitory memory, tradeline data associated with a primary debtor in a data store containing credit bureau data, combining, by the computer-based system, a subset of the tradeline data using a fingerprinting function to yield a tradeline fingerprint, querying, by the computer-based system, the data store for the tradeline fingerprint to retrieve a secondary debtor associated with the tradeline fingerprint, wherein a debtor entity comprises the primary debtor and the secondary debtor, querying, by the computer-based system, the data store comprising credit bureau data to retrieve debtor entity tradeline data including an installment tradeline, wherein the installment tradeline is associated with the primary debtor and the secondary debtor.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosed embodiments.

FIG. 5 is a diagram of financial data used for model generation and validation according to the process of FIG. 2;

FIGS. 11-19 are tables showing exemplary results and outputs of the process of FIG. 6 against a sample consumer population;

FIG. 21 is a chart identifying various example household types;

DETAILED DESCRIPTION

Figure 1A:
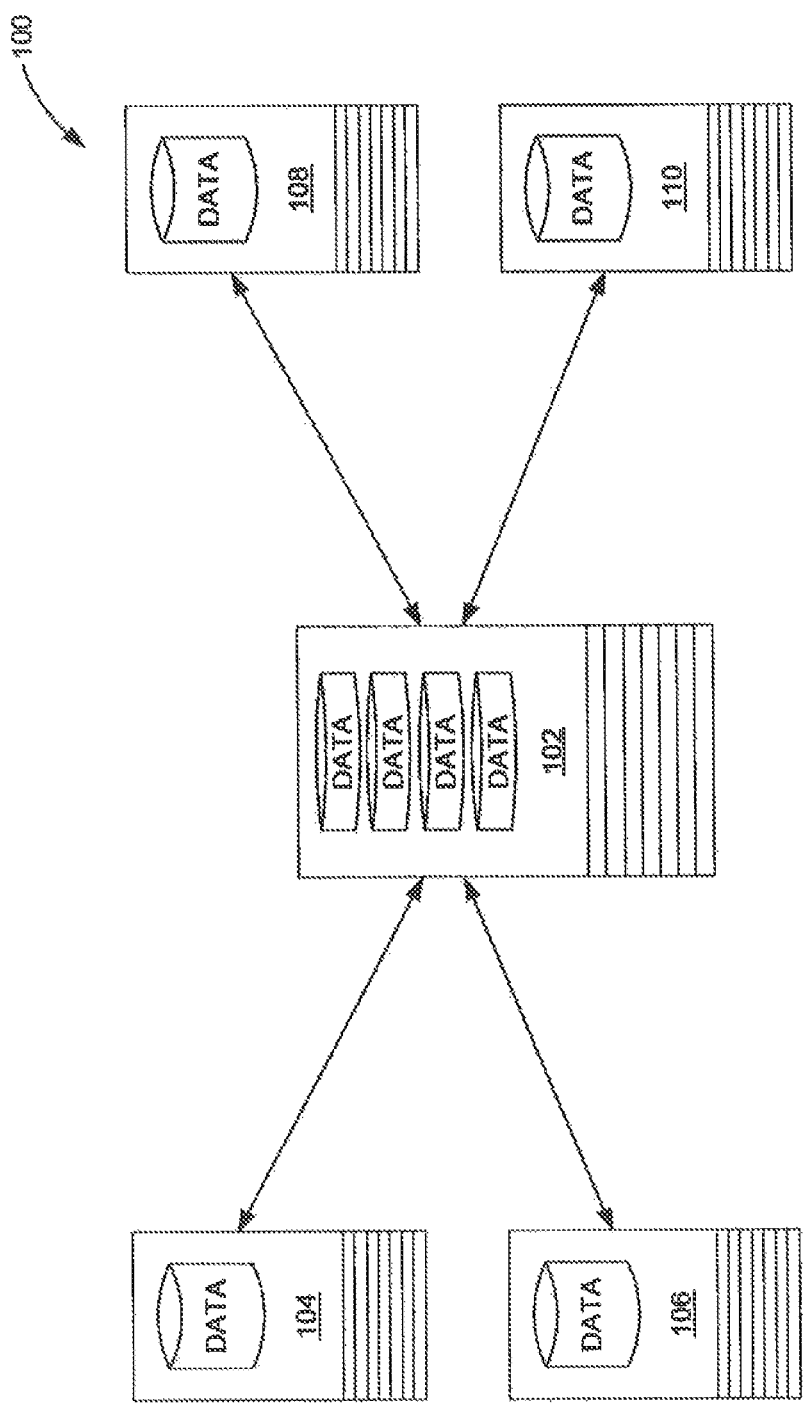
FIGS. 1A and 1B are block diagrams of an exemplary financial data exchange network over which the processes of the present disclosure may be performed.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Internal data includes any data a credit issuer possesses or acquires pertaining to a particular consumer. Internal data may be gathered before, during, or after a relationship between the credit issuer and the consumer. Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also for example, transaction vendor/merchant location may include a particular web address, such as a Uniform Resource Locator ("URL"), an email address and/or an Internet Protocol ("IP") address for a vendor/merchant. Transaction vendor/merchant location may also include information gathered from a WHOIS database pertaining to the registration of a particular web or IP address. WHOIS databases include databases that contain data pertaining to Internet IP address registrations. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Internal data may further comprise closed-loop data and open-loop data. Closed-loop data includes data obtained from a credit issuer's closed-loop transaction system. A closed-loop transaction system includes transaction systems under the control of one party. Closed-loop transaction systems may be used to obtain consumer transactional data. Open-loop data includes data obtained from a credit issuer's open-loop transaction system. An open-loop transaction system includes transaction systems under the control of multiple parties.

Credit bureau data includes any data received and/or retained by a credit bureau pertaining to a particular consumer. A credit bureau includes any organization that collects and/or distributes consumer data. A credit bureau may be a consumer reporting agency. Credit bureaus generally collect financial information pertaining to consumers. Credit bureau data may include, for example, consumer account data, credit limits, balances, and payment history. Credit bureau data may include credit bureau scores that reflect a consumer's creditworthiness. Credit bureau scores are developed from data available in a consumer's file such as, for example, the amount of lines of credit, payment performance, balance, and number of tradelines. Consumer data is used to model the risk of a consumer over a period of time using statistical regression analysis. In one embodiment, those data elements that are found to be indicative of risk are weighted and combined to determine the credit score. For example, each data element may be given a score, with the final credit score being the sum of the data element scores.

As used herein, a debtor may mean a consumer or business that either owes or may owe money to another party, such as a credit issuer. Thus, a debtor includes consumers who have not yet borrow money but may apply or have applied to receive a loan.

Credit bureaus may receive credit bureau reporting data from a reporting entity (e.g., a credit issuer) using a standardized format, such as an XML scheme or other structured data container. For example, the METRO 2 container is standardized format. The METRO 2 container may one or more of a Header Record, a Base Segment, a J1 Segment, a J2 Segment, a K1 Segment, and a Trailer Record. The METRO 2 container may be a fixed width file meaning, for example, each data field may be designated a fixed width that it may not exceed. The METRO 2 container may comprise a delimited file where each data field is delimited by a delimiter, such a comma, semicolon, or pipe "|" character. The METRO 2 container may be formatted in accordance with an XML schema. Credit bureau reporting data may be reported periodically by a credit issuer to report on the status of a particular tradeline.

The METRO 2 Header Record may be formatted as:
Header Record

| Field | Field Name | Length | Position | Source |
|---|---|---|---|---|
| 1 | Record Descriptor | 4 | 1-4 | Line Length |
| 2 | Record Identifier | 6 | 5-10 | Header |
| 3 | Cycle Number | 2 | 11-12 | Cycle Reporting -- BLANK |
| 4 | CCA Identifier | 10 | 13-22 | BLANK |
| 5 | Equifax Identifier | 10 | 23-32 | Credit Bureau Setup Equifax Credit Grantor # |
| 6 | Experian Identifier | 5 | 33-37 | Credit Bureau Setup Experian Control # |
| 7 | Trans Union Identifier | 10 | 38-47 | Credit Bureau Setup TU Credit Grantor # |
| 8 | Activity Date | 8 | 48-55 | Last update to account balances |
| 9 | Date Created | 8 | 56-63 | Credit Report Date |
| 10 | Program Date | 8 | 64-71 | Internal Program Date |
| 11 | Program Revision Date | 8 | 73-79 | Internal Program Date |
| 12 | Reporter Name | 40 | 80-119 | Company Details Name |
| 13 | Reported Address | 96 | 120-215 | Company Details Address Lines 1-3 |
| 14 | Reporter Phone | 10 | 216-225 | Company Details Phone |
| 15 | Reserved | 201 | 226-426 | Program Creator and Version -- Help About |

The METRO 2 Base Segment may be formatted as:
Base Segment

| Field | Field Name | Length | Position | Source |
|---|---|---|---|---|
| 1 | Record Descriptor | 4 | 1-4 | Record length |
| 2 | Processing Indicator | 1 | 5 | Processing instruction |
| 3 | Time Stamp | 14 | 6-19 | Contact created Date and Time |
| 4 | Correction Indicator | 1 | 20 | Internal |
| 5 | Identification Number | 20 | 21-40 | Credit Bureau Setup Identification # |
| 6 | Cycle Identifier | 2 | 41-42 | Cycle Reporting -- BLANK |
| 7 | Consumer Account Number | 30 | 43-72 | Debtor File #or Client Account # |
| 8 | Portfolio Type | 1 | 73 | Credit Report Details Portfolio |
| 9 | Account Type | 2 | 74-75 | Credit Report Details Account Type |
| 10 | Date Opened | 8 | 76-83 | Debtor Listed Date |
| 11 | Credit Limit | 9 | 84-92 | ZERO FILL |
| 12 | Highest Credit or Original Loan Amount | 9 | 93-101 | Debtor Principal |
| 13 | Terms Duration | 3 | 102-104 | 001 |
| 14 | Terms Frequency | 1 | 105 | BLANK |
| 15 | Scheduled Monthly Payment Amount | 9 | 106-114 | ZERO FILL |
| 16 | Actual Payment Amount | 9 | 115-123 | Payment Transactions Amount |
| 17A | Account Status | 2 | 124-125 | Credit Report Details Status Code |
| 17B | Payment Rating | 1 | 126 | BLANK |
| 18 | Payment History Profile | 24 | 127-150 | B - No Payment History |
| 19 | Special Comment | 2 | 151-152 | Credit Report Details Special Comments |

-continued

The METRO 2 Base Segment may be formatted as:
Base Segment

| Field | Field Name | Length | Position | Source |
|---|---|---|---|---|
| 20 | Compliance Condition Code | 2 | 153-154 | Credit Report Details Condition Code |
| 21 | Current Balance | 9 | 155-163 | Debtor Owing |
| 22 | Amount Past Due | 9 | 164-172 | ZERO FILL |
| 23 | Original Charge-off Amount | 9 | 173-181 | ZERO FILL |
| 24 | Date of Account Information | 8 | 182-189 | Credit Report Date |
| 25 | FCRA Compliance/Date of First Delinquency | 8 | 190-197 | Debtor Delnqnt or zero filled if Current |
| 26 | Date Closed | 8 | 198-205 | Metro Contact Date or zero filled if not Closed |
| 27 | Date of Last Payment | 8 | 206-213 | Debtor Payment |
| 28 | Reserved | 17 | 214-230 | BLANK |
| 29 | Consumer Transaction Type | 1 | 231 | Internal |
| 30 | Surname | 25 | 232-256 | Debtor Name |
| 31 | First Name | 20 | 257-276 | Debtor Name |
| 32 | Middle Name | 20 | 277-296 | BLANK |
| 33 | Generation Code | 1 | 297 | Debtor Generation |
| 34 | Social Security Number | 9 | 298-306 | Debtor SSN# |
| 35 | Date of Birth | 8 | 307-314 | Debtor DOB |
| 36 | Telephone Number | 10 | 315-324 | Debtor Home |
| 37 | ECOA Code | 1 | 325 | Credit Report Details Association Code (ECOA) |
| 38 | Consumer Information Indicator | 2 | 326-327 | Credit Report Details Indicator |
| 39 | Country Code | 2 | 328-329 | Debtor Country |
| 40 | First Line of Address | 32 | 330-361 | Debtor Address |
| 41 | Second Line of Address | 32 | 362-393 | Debtor Address Line 2 |
| 42 | City | 20 | 394-413 | Debtor City |
| 43 | State | 2 | 414-415 | Debtor State |
| 44 | Postal/Zip Code | 9 | 416-424 | Debtor Zip |
| 45 | Address Indicator | 1 | 425 | Debtor Address OK |
| 46 | Residence Code | 1 | 426 | BLANK |

The METRO 2 J1 Segment may be formatted as:

Field — Same Address

| Field | Field Name | Length | Position | Source |
|---|---|---|---|---|
| 1 | Segment Identifier | 2 | 1-2 | J1 |
| 2 | Consumer Transaction Type | 1 | 3 | Internal |
| 3 | Surname | 25 | 4-28 | Debtor Cosigner Name |
| 4 | First Name | 20 | 29-48 | Debtor Cosigner Name |
| 5 | Middle Name | 20 | 49-68 | BLANK |
| 6 | Generation Code | 1 | 69 | Debtor Cosigner Generation |
| 7 | Social Security Number | 9 | 70-78 | Debtor Cosigner SSN |
| 8 | Date of Birth | 8 | 79-86 | Debtor Cosigner DOB |
| 9 | Telephone Number | 10 | 87-96 | Debtor Cosigner Home |
| 10 | ECOA Code | 1 | 97 | Debtor Cosigner ECOA |
| 11 | Consumer Information Indicator | 2 | 98-99 | Debtor Cosigner Indicator |
| 12 | Reserved | 1 | 100 | BLANK |

The METRO 2 J2 Segment may be formatted as:

J2 Segment — Different Address

| Field | Field Name | Length | Position | Source |
|---|---|---|---|---|
| 1 | Segment Identifier | 2 | 1-2 | J2 |
| 2 | Consumer Transaction Type | 1 | 3 | Internal |
| 3 | Surname | 25 | 4-28 | Debtor Cosigner Name |
| 4 | First Name | 20 | 29-48 | Debtor Cosigner Name |
| 5 | Middle Name | 20 | 49-68 | BLANK |

The METRO 2 J2 Segment may be formatted as:

J2 Segment — Different Address

| Field | Field Name | Length | Position | Source |
|---|---|---|---|---|
| 6 | Generation Code | 1 | 69 | Debtor Cosigner Generation |
| 7 | Social Security Number | 9 | 70-78 | Debtor Cosigner SSN |
| 8 | Date of Birth | 8 | 79-86 | Debtor Cosigner DOB |
| 9 | Telephone Number | 10 | 87-96 | Debtor Cosigner Home |
| 10 | ECOA Code | 1 | 97 | Debtor Cosigner ECOA |
| 11 | Consumer Information Indicator | 2 | 98-99 | Debtor Cosigner Indicator |
| 12 | Country Code | 2 | 100-101 | Debtor Cosigner Country |
| 13 | First Line of Address | 32 | 102-133 | Debtor Cosigner Address Line 1 |
| 14 | Second Line of Address | 32 | 134-165 | Debtor Cosigner Address Line 2 |
| 15 | City | 20 | 166-185 | Debtor Cosigner City |
| 16 | State | 2 | 186-187 | Debtor Cosigner State |
| 17 | Postal/Zip Code | 9 | 188-196 | Debtor Cosigner Zip |
| 18 | Address Indicator | 1 | 197 | Debtor Cosigner Address OK |
| 19 | Residence Code | 1 | 198 | BLANK |
| 20 | Reserved | 2 | 199-200 | BLANK |

The METRO 2 K1 Segment may be formatted as:
K1 Segment

| Field | Field Name | Length | Position | Source |
|---|---|---|---|---|
| 1 | Segment Identifier | 2 | 1-2 | K1 |
| 2 | Original Creditor Name | 30 | 3-32 | Client Name |
| 3 | Creditor Classification | 2 | 33-34 | Client Type |

A debt obligation includes any obligation a consumer has to pay a lender. Any extension of credit from a lender to a consumer is also considered a debt obligation. A debt obligation may be secured or unsecured. Secured obligations may be secured with either real or personal property. A loan or a credit account are types of debt obligations, and a security backed by debt obligations is considered a debt obligation itself. A mortgage includes a loan, typically in the form of a promissory note, secured by real property. The real property may be secured by any legal means, such as, for example, via a mortgage or deed of trust. For convenience, a mortgage is used herein to refer to a loan secured by real property. An automobile loan includes a loan, typically in the form of a promissory note, which is secured by an automobile. For convenience, an automobile loan is used herein to refer to a loan secured by an automobile.

A trade or tradeline includes a credit or charge vehicle typically issued to an individual consumer by a credit issuer. Types of tradelines include, for example, installment accounts such as bank loans, student loans, home equity loans, automobile loans/leases, and mortgages and revolving accounts such as credit card accounts (e.g., a transaction account), charge card accounts (e.g., a transaction account), retail cards, and personal lines of credit.

Tradeline data includes the consumer's account status and activity such as, for example, names of companies where the consumer has accounts, dates such accounts were opened, credit limits, types of accounts, balances over a period of time and summary payment histories. Tradeline data is generally available for the vast majority of actual consumers. Tradeline data, however, typically does not include individual transaction data, which is largely unavailable because of consumer privacy protections. Tradeline data may be used to determine both individual and aggregated consumer spending patterns, as described herein. Tradeline data may further include negative credit information, such as late payment histories, write-offs, settlements, judgments, and other indicia that the balance associated with the tradeline was not paid in accordance with an underlying loan agreement.

Any transaction account or credit account discussed herein may include an account or an account number. An "account" or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

A lender or credit issuer includes any person, entity, software and/or hardware that provides lending services. A lender may deal in secured or unsecured debt obligations. A lender may engage in secured debt obligations where either real or personal property acts as collateral. A lender need not originate loans but may hold securities backed by debt obligations. A lender may be only a subunit or subdivision of a larger organization. A mortgage holder includes any person or entity that is entitled to repayment of a mortgage. An automobile loan holder is any person or entity that is entitled to repayment of an automobile loan. As used herein, the terms lender and credit issuer may be used interchangeably. Credit issuers may include financial services companies that issue credit to consumers.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Systems and methods disclosed herein may be useful in conjunction with a determination of a size of wallet and/or share of wallet. Systems and methods related to size of wallet and/or share of wallet are described in U.S. Pat. No. 7,788,147, filed Oct. 29, 2004 and entitled, "Method and apparatus for estimating the spend capacity of consumers," and U.S. Pat. No. 7,912,770, filed Jun. 20, 2005 and entitled, "Method and apparatus for consumer interaction based on spend capacity," and U.S. patent application Ser. No. 11/497,563, filed Aug. 2, 2006 and entitled, "Determining commercial share of wallet," all of which are incorporated herein by reference.

Size of Wallet

Technology advances have made it possible to store, manipulate and model large amounts of time series data with minimal expenditure on equipment. As will now be described, a financial institution may leverage these technological advances in conjunction with the types of consumer data presently available in the marketplace to more readily estimate the spend capacity of potential and actual customers. A reliable capability to assess the size of a consumer's wallet is introduced in which aggregate time series and raw tradeline data are used to model consumer behavior and attributes, and identify categories of consumers based on aggregate behavior. The use of raw trade-line time series data, and modeled consumer behavior attributes, including but not limited to, consumer panel data and internal consumer data, allows actual consumer spend behavior to be derived from point in time balance information.

In addition, the advent of consumer panel data provided through interne channels provides continuous access to actual consumer spend information for model validation and refinement. Industry data, including consumer panel information having consumer statement and individual transaction data, may be used as inputs to the model and for subsequent verification and validation of its accuracy. The model is developed and refined using actual consumer information with the goals of improving the customer experience and increasing billings growth by identifying and leveraging increased consumer spend opportunities.

A credit provider or other financial institution may also make use of internal proprietary customer data retrieved from its stored internal financial records. Such internal data provides access to even more actual customer spending information, and may be used in the development, refinement and validation of aggregated consumer spending models, as well as verification of the models' applicability to existing individual customers on an ongoing basis.

While there has long been market place interest in understanding spend to align offers with consumers and assign credit line size, the holistic approach of using a size of wallet calculation across customers' lifecycles (that is, acquisitions through collections) has not previously been provided. The various data sources outlined above provide the opportunity for unique model logic development and deployment, and as described in more detail in the following, various categories of consumers may be readily identified from aggregate and individual data. In certain embodiments of the processes disclosed herein, the models may be used to identify specific types of consumers, nominally, labeled 'transactors' and 'revolvers,' based on aggregate spending behavior, and to then identify individual customers and prospects that fall into one of these categories. Consumers falling into these categories may then be offered commensurate purchasing incentives based on the model's estimate of consumer spending ability.

Referring now to FIGS. 1A, 1B, and 2-19, wherein similar components of the present disclosure are referenced in like manner, various embodiments of a method and system for estimating the purchasing ability of consumers will now be described in detail.

Turning now to FIG. 1A, there is depicted an exemplary computer network 100 over which the transmission of the various types of consumer data as described herein may be accomplished, using any of a variety of available computing components for processing such data in the manners described below. Such components may include an institution computer 102, which may be a computer, workstation or server, such as those commonly manufactured by IBM, and operated by a financial institution or the like. The institution computer 102, in turn, has appropriate internal hardware, software, processing, memory and network communication components that enables it to perform the functions described here, including storing both internally and externally obtained individual or aggregate consumer data in appropriate memory and processing the same according to the processes described herein using programming instructions provided in any of a variety of useful machine languages. Institution computer 102 is described in further detail with respect to FIG. 1B.

Figure 1B:
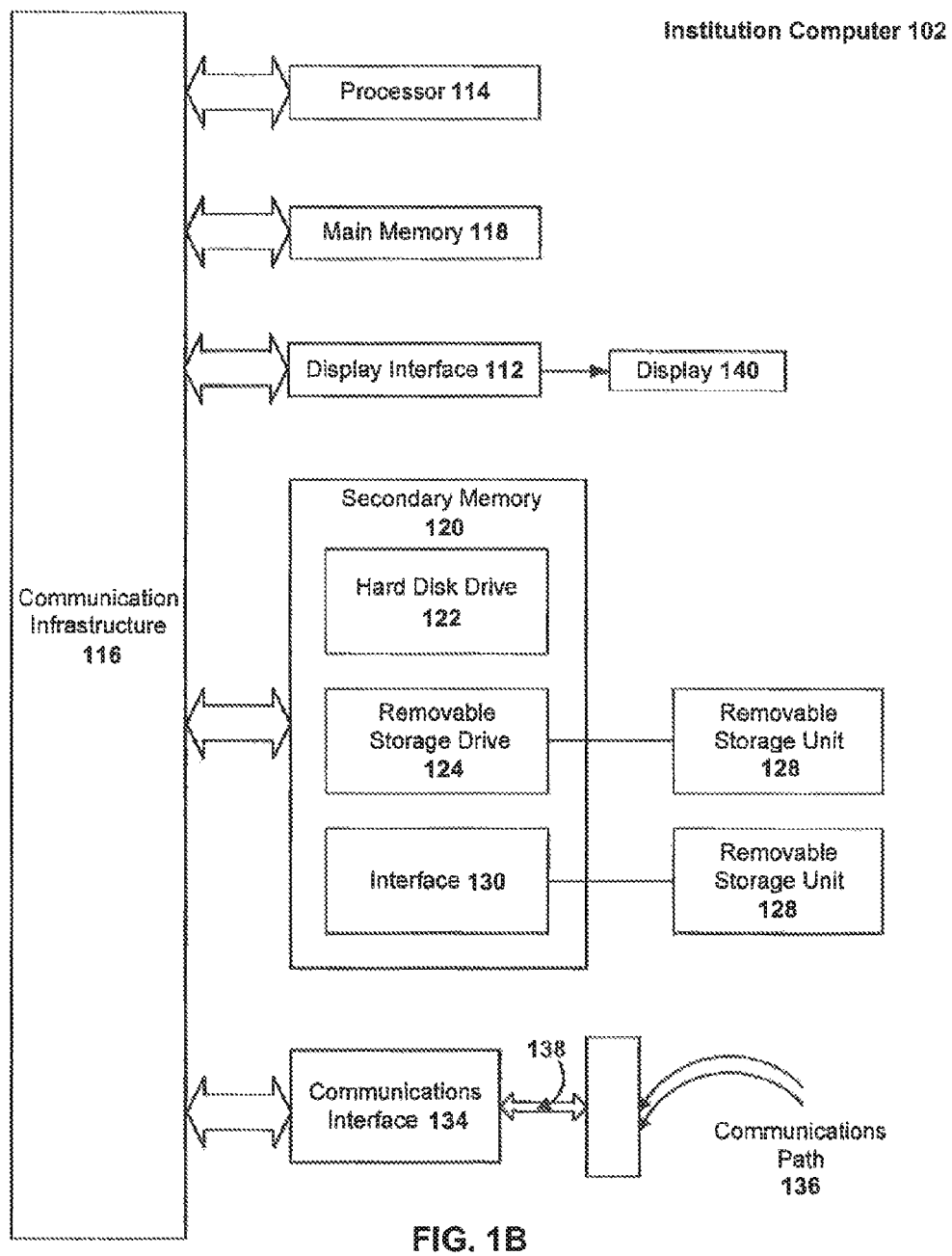

As shown in FIG. 1B, the institution computer 102 includes one or more processors, such as processor 114. The processor 114 is connected to a communication infrastructure 116 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Institution computer 102 can include a display interface 112 that forwards graphics, text, and other data from the communication infrastructure 116 (or from a frame buffer not shown) for display on the display unit 140.

Institution computer 102 also includes a main memory 118, preferably random access memory (RAM), and may also include a secondary memory 120. The secondary memory 120 may include, for example, a hard disk drive 122 and/or a removable storage drive 124, representing a floppy disk drive, a magnetic tape drive, an optical disk drive, etc. The removable storage drive 124 reads from and/or writes to a removable storage unit 128 in a well known manner. Removable storage unit 128 represents a floppy disk, magnetic tape, optical disk, etc. which is read by and written to by removable storage drive 124. As will be appreciated, the removable storage unit 128 includes a computer usable storage medium having stored therein computer software and/or data.

In alternative embodiments, secondary memory 120 may include other similar devices for allowing computer programs or other instructions to be loaded into institution computer 102. Such devices may include, for example, a removable storage unit 128 and an interface 130. Examples of such may include a program cartridge and cartridge interface (such as that found in video game devices), a removable memory chip (such as an erasable programmable read only memory (EPROM), or programmable read only memory (PROM))

and associated socket, and other removable storage units 128 and interfaces 130, which allow software and data to be transferred from the removable storage unit 128 to institution computer 102.

Institution computer 102 may also include a communications interface 134. Communications interface 134 allows software and data to be transferred between institution computer 102 and external devices. Examples of communications interface 134 may include a modem, a network interface (such as an Ethernet card), a communications port, a Personal Computer Memory Card International Association (PCMCIA) slot and card, etc. Software and data transferred via communications interface 134 are in the form of signals 138 which may be electronic, electromagnetic, optical or other signals capable of being received by communications interface 134. These signals 138 are provided to communications interface 134 via a communications path (e.g., channel) 136. This channel 136 carries signals 138 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 124 and a hard disk installed in hard disk drive 122. These computer program products provide software to institution computer 102. The invention is directed to such computer program products.

Computer programs (also referred to as computer control logic) are stored in main memory 118 and/or secondary memory 120. Computer programs may also be received via communications interface 134. Such computer programs, when executed, enable the institution computer 102 to perform the features of the present invention, as discussed herein. In particular, the computer programs, when executed, enable the processor 114 to perform the features of the present invention. Accordingly, such computer programs represent controllers of the institution computer 102.

In an embodiment where the invention is implemented using software, the software may be stored in a computer program product and loaded into institution computer 102 using removable storage drive 124, hard drive 122 or communications interface 134. The control logic (software), when executed by the processor 114, causes the processor 114 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The institution computer 102 may in turn be in operative communication with any number of other internal or external computing devices, including for example components 104, 106, 108, and 110, which may be computers or servers of similar or compatible functional configuration. These components 104-110 may gather and provide aggregated and individual consumer data, as described herein, and transmit the same for processing and analysis by the institution computer 102. Such data transmissions may occur for example over the Internet or by any other known communications infrastructure, such as a local area network, a wide area network, a wireless network, a fiber-optic network, or any combination or interconnection of the same. Such communications may also be transmitted in an encrypted or otherwise secure format, in any of a wide variety of known manners.

Each of the components 104-110 may be operated by either common or independent entities. In one exemplary embodiment, which is not to be limiting to the scope of the present disclosure, one or more such components 104-110 may be operated by a provider of aggregate and individual consumer tradeline data, an example of which includes services provided by Experian Information Solutions, Inc. of Costa Mesa, Calif. ("Experian"). Tradeline level data preferably includes up to 24 months or more of balance history and credit attributes captured at the tradeline level, including information about accounts as reported by various credit grantors, which in turn may be used to derive a broad view of actual aggregated consumer behavioral spending patterns.

Alternatively, or in addition thereto, one or more of the components 104-110 may likewise be operated by a provider of individual and aggregate consumer panel data, such as commonly provided by comScore Networks, Inc. of Reston, Va. ("comScore"). Consumer panel data provides more detailed and specific consumer spending information regarding millions of consumer panel participants, who provide actual spend data to collectors of such data in exchange for various inducements. The data collected may include any one or more of credit risk scores, online credit card application data, online credit card purchase transaction data, online credit card statement views, credit trade type and credit issuer, credit issuer code, portfolio level statistics, credit bureau reports, demographic data, account balances, credit limits, purchases, balance transfers, cash advances, payment amounts, finance charges, annual percentage interest rates on accounts, and fees charged, all at an individual level for each of the participating panelists. In various embodiments, this type of data is used for model development, refinement and verification. This type of data is further advantageous over tradeline level data alone for such purposes, since such detailed information is not provided at the tradeline level. While such detailed consumer panel data can be used alone to generate a model, it may not be wholly accurate with respect to the remaining marketplace of consumers at large without further refinement. Consumer panel data may also be used to generate aggregate consumer data for model derivation and development.

Additionally, another source of inputs to the model may be internal spend and payment history of the institution's own customers. From such internal data, detailed information at the level of specificity as the consumer panel data may be obtained and used for model development, refinement and validation, including the categorization of consumers based on identified transactor and revolver behaviors.

Figure 2:
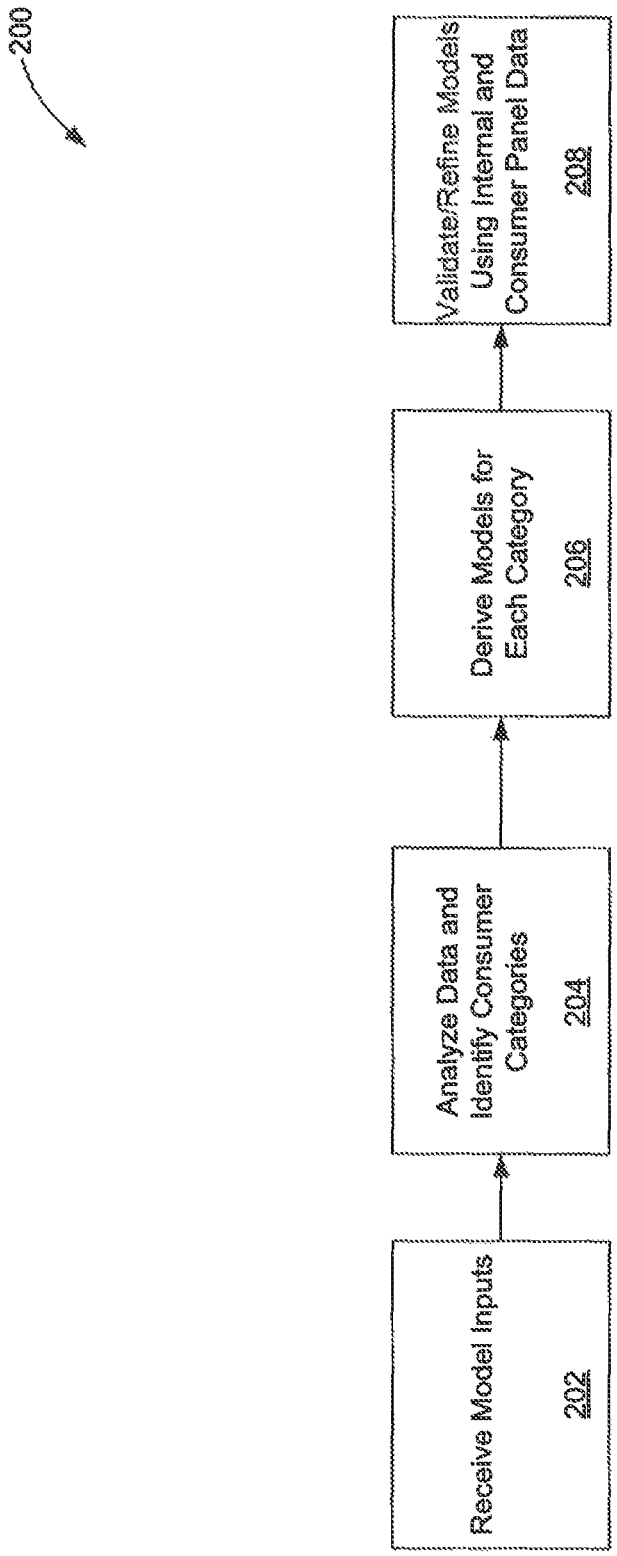
FIG. 2 is a flowchart of an exemplary consumer modeling process performed by the financial server of FIG. 1.

Turning now to FIG. 2, there is depicted a flowchart of an exemplary process 200 for modeling aggregate consumer behavior in accordance with the present disclosure. The process 200 commences at step 202 wherein individual and aggregate consumer data, including time-series tradeline data, consumer panel data and internal customer financial data, is obtained from any of the data sources described previously as inputs for consumer behavior models. In certain embodiments, the individual and aggregate consumer data may be provided in a variety of different data formats or structures and consolidated to a single useful format or structure for processing.

Next, at step 204, the individual and aggregate consumer data is analyzed to determine consumer spending behavior patterns. One of ordinary skill in the art will readily appreciate that the models may include formulas that mathematically describe the spending behavior of consumers. The particular formulas derived will therefore highly depend on the values resulting from customer data used for derivation, as will be readily appreciated. However, by way of example only and based on the data provided, consumer behavior may be modeled by first dividing consumers into categories that may be based on account balance levels, demographic profiles, household income levels or any other desired categories. For each of these categories in turn, historical account balance and transaction information for each of the consumers may be tracked over a previous period of time, such as one to two years. Algorithms may then be employed to determine formulaic descriptions of the distribution of aggregate consumer information over the course of that period of time for the population of consumers examined, using any of a variety of known mathematical techniques. These formulas in turn may be used to derive or generate one or more models (step 206) for each of the categories of consumers using any of a variety of available trend analysis algorithms. The models may yield the following types of aggregated consumer information for each category: average balances, maximum balances, standard deviation of balances, percentage of balances that change by a threshold amount, and the like.

Finally, at step 208, the derived models may be validated and periodically refined using internal customer data and consumer panel data from sources such as comScore. In various embodiments, the model may be validated and refined over time based on additional aggregated and individual consumer data as it is continuously received by an institution computer 102 over the network 100. Actual customer transaction level information and detailed consumer information panel data may be calculated and used to compare actual consumer spend amounts for individual consumers (defined for each month as the difference between the sum of debits to the account and any balance transfers into the account) and the spend levels estimated for such consumers using the process 200 above. If a large error is demonstrated between actual and estimated amounts, the models and the formulas used may be manually or automatically refined so that the error is reduced. This allows for a flexible model that has the capability to adapt to actual aggregated spending behavior as it fluctuates over time.

Figure 3:
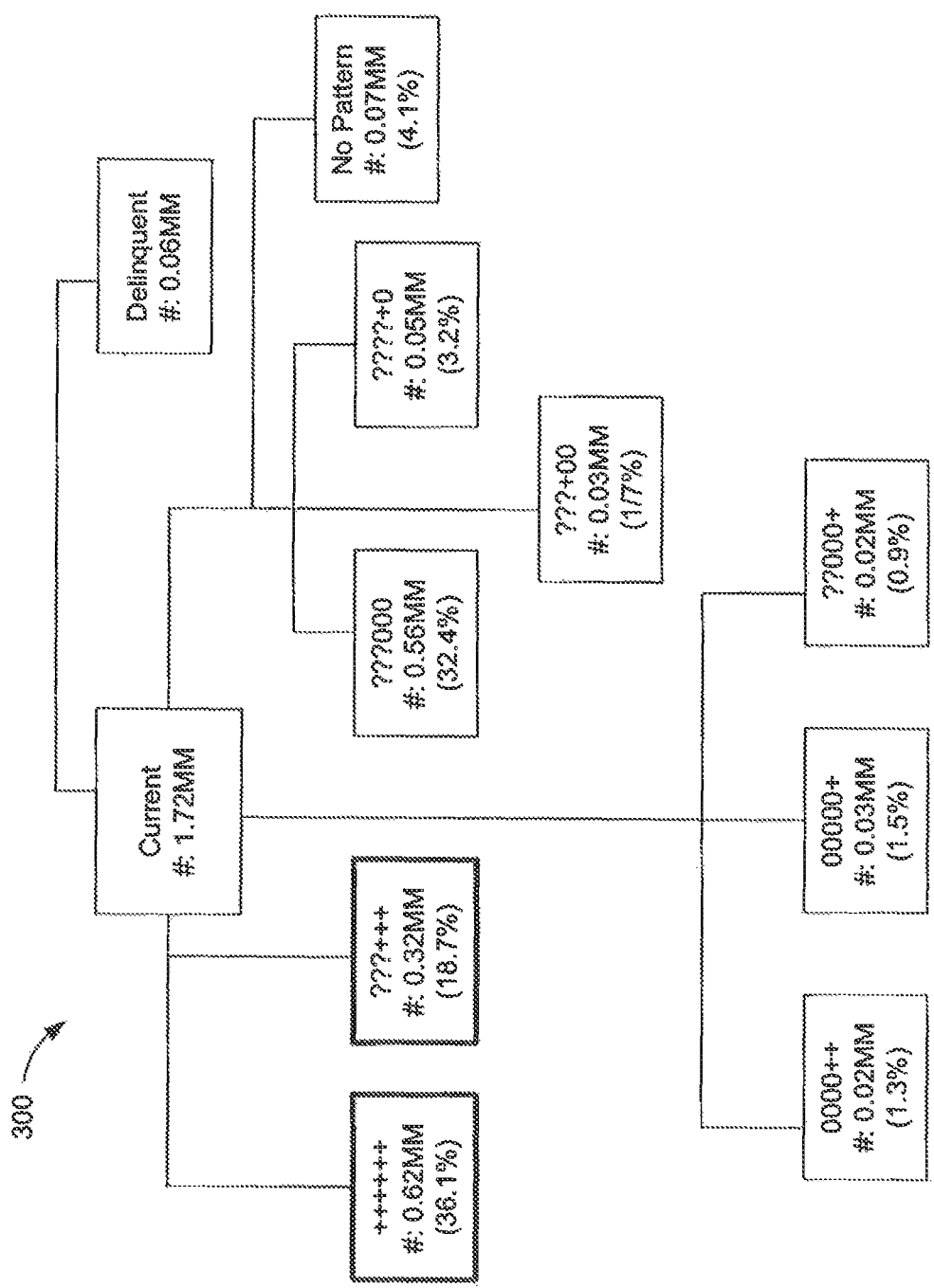
FIG. 3 is a diagram of exemplary categories of consumers examined during the process of FIG. 2.

As shown in the diagram 300 of FIG. 3, a population of consumers for which individual and/or aggregated data has been provided may be divided first into two general categories for analysis, for example, those that are current on their credit accounts (representing 1.72 million consumers in the exemplary data sample size of 1.78 million consumers) and those that are delinquent (representing 0.06 million of such consumers). In one embodiment, delinquent consumers may be discarded from the populations being modeled.

In further embodiments, the population of current consumers is then subdivided into a plurality of further categories based on the amount of balance information available and the balance activity of such available data. In the example shown in the diagram 300, the amount of balance information available is represented by string of '+' '0' and '?' characters. Each character represents one month of available data, with the rightmost character representing the most current months and the leftmost character representing the earliest month for which data is available. In the example provided in FIG. 3, a string of six characters is provided, representing the six most recent months of data for each category. The "+" character represents a month in which a credit account balance of the consumer has increased. The "0" character may represent months where the account balance is zero. The "?" character represents months for which balance data is unavailable. Also provided the diagram is number of consumers fallen to each category and the percentage of the consumer population they represent in that sample.

In further embodiments, only certain categories of consumers may be selected for modeling behavior. The selection may be based on those categories that demonstrate increased spend on their credit balances over time. However, it should be readily appreciated that other categories can be used. FIG. 3 shows the example of two categories of selected consumers for modeling in bold. These groups show the availability of at least the three most recent months of balance data and that the balances increased in each of those months.

Figure 4:
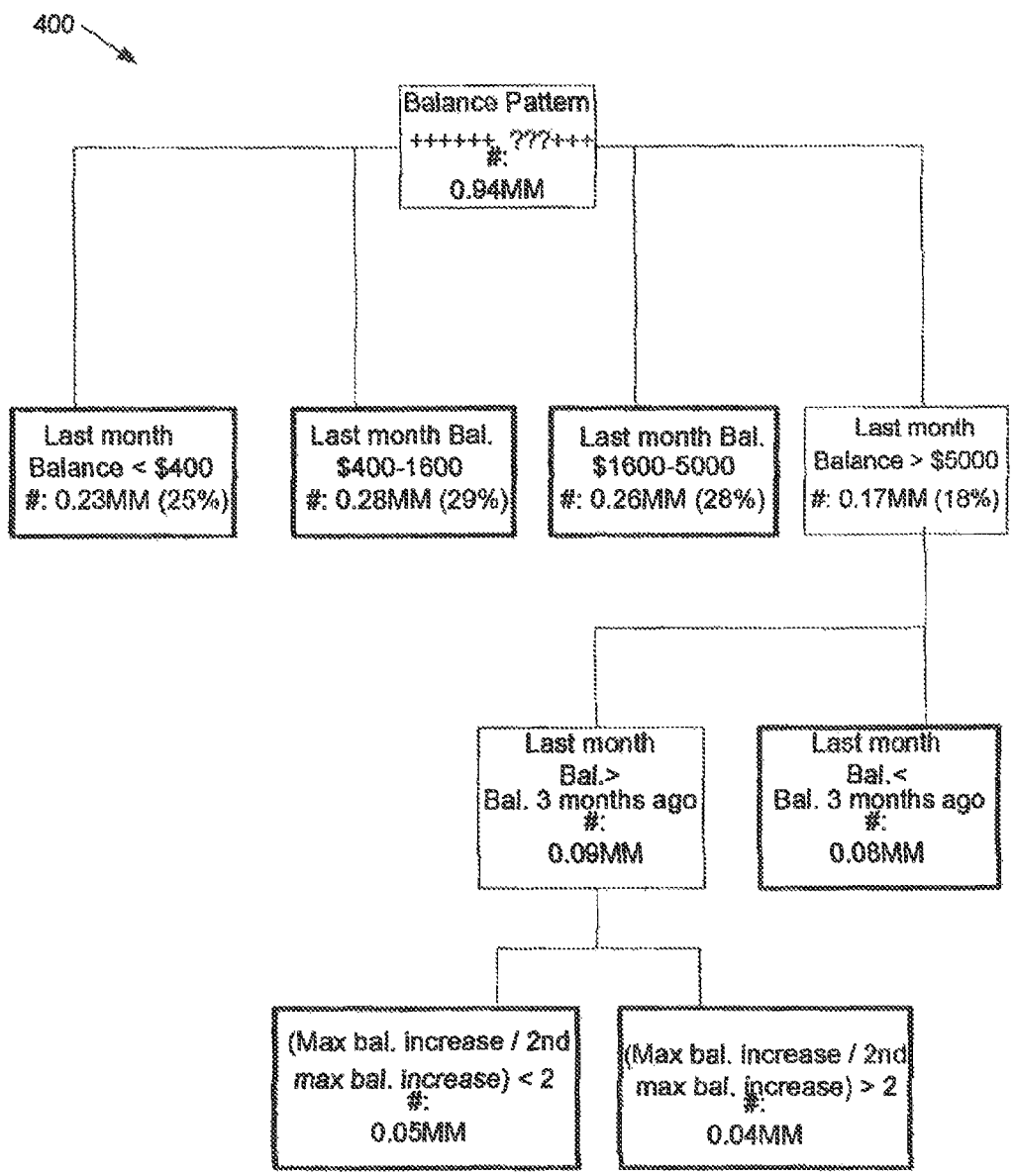
FIG. 4 is a diagram of exemplary subcategories of consumers modeled during the process of FIG. 2.

Turning now to FIG. 4, therein is depicted an exemplary diagram 400 showing sub-categorization of the two categories of FIG. 3 in bold that are selected for modeling. In the embodiment shown, the sub-categories may include: consumers having a most recent credit balance less than $400; consumers having a most recent credit balance between $400 and $1600; consumers having a most recent credit balance between $1600 and $5000; consumers whose most recent credit balance is less than the balance of, for example, three months ago; consumers whose maximum credit balance increase over, for example, the last twelve months divided by the second highest maximum balance increase over the same period is less than 2; and consumers whose maximum credit balance increase over the last twelve months divided by the second highest maximum balance increase is greater than 2. It should be readily appreciated that other subcategories can be used. Each of these sub-categories is defined by their last month balance level. The number of consumers from the sample population (in millions) and the percentage of the population for each category are also shown in FIG. 4.

There may be a certain balance threshold established, wherein if a consumer's account balance is too high, their behavior may not be modeled, since such consumers are less likely to have sufficient spending ability. Alternatively, or in addition thereto, consumers having balances above such threshold may be sub-categorized yet, again, rather than completely discarded from the sample. In the example shown in FIG. 4, the threshold value may be $5000, and only those having particular historical balance activity may be selected, i.e. those consumers whose present balance is less than their balance three months earlier, or whose maximum balance increase in the examined period meets certain parameters. Other threshold values may also be used and may be dependent on the individual and aggregated consumer data provided.

As described in the foregoing, the models generated in the process 200 may be derived, validated and refined using tradeline and consumer panel data. An example of tradeline data 500 from Experian and consumer panel data 502 from comScore are represented in FIG. 5. Each row of the data 500, 502 represents the record of one consumer and thousands of such records may be provided at a time. The statement 500 shows the point-in-time balance of consumers accounts for three successive months (Balance 1, Balance 2 and Balance 3). The data 502 shows each consumer's purchase volume, last payment amount, previous balance amount and current balance. Such information may be obtained, for example, by page scraping the data (in any of a variety of known manners using appropriate application programming interfaces) from an Internet web site or network address at which the data 502 is displayed. Furthermore, the data 500 and 502 may be matched by consumer identity and combined by one of the data providers or another third party independent of the financial institution. Validation of the models using the combined data 500 and 502 may then be performed, and such validation may be independent of consumer identity.

Figure 6:
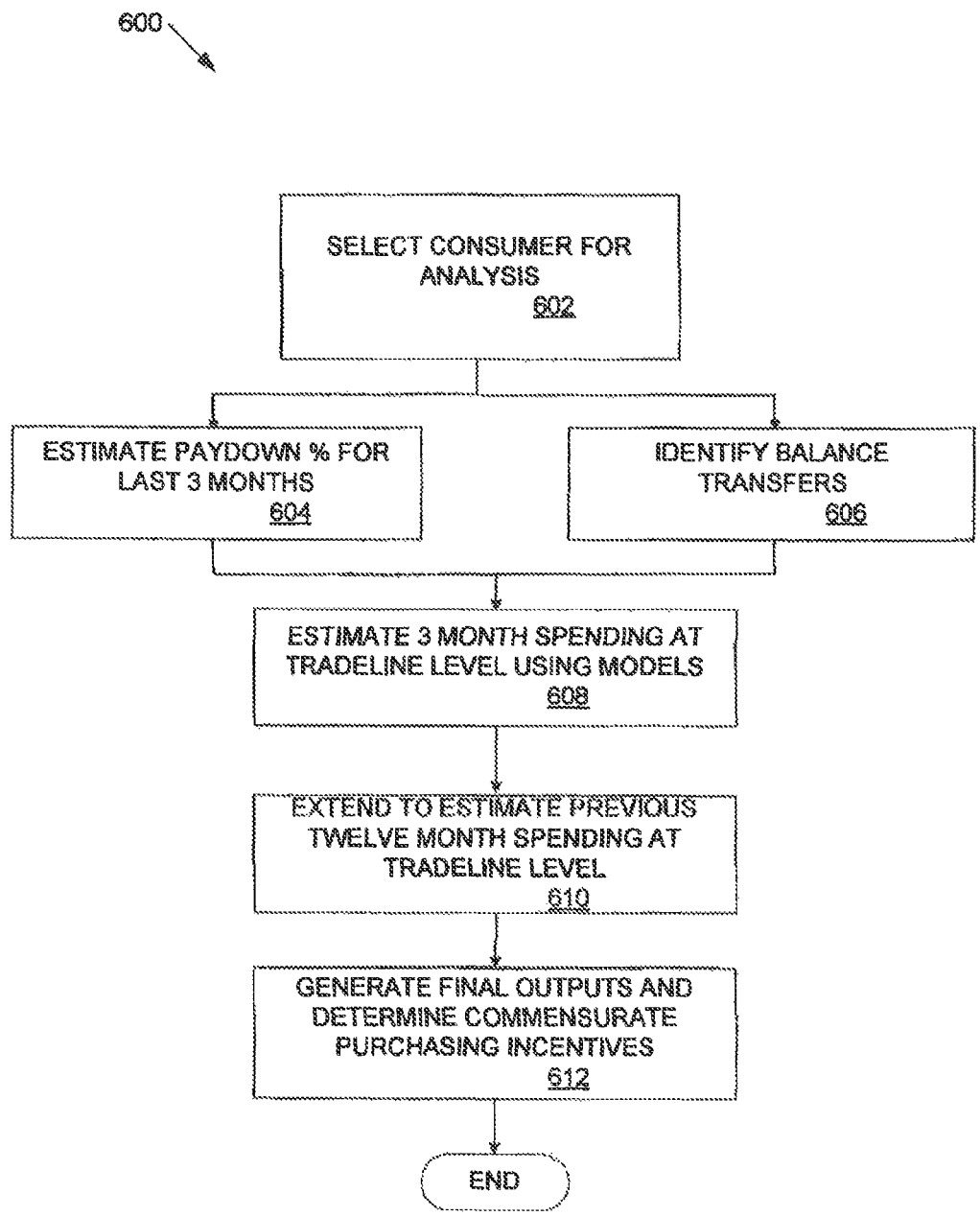
FIG. 6 is a flowchart of an exemplary process for estimating the spend ability of a consumer, performed by the financial server of FIG. 1.

Turning now to FIG. 6, therein is depicted an exemplary process 600 for estimating the size of an individual consumer's spending wallet. Upon completion of the modeling of the consumer categories above, the process 600 commences with the selection of individual consumers or prospects to be examined (step 602). An appropriate model derived during the process 200 will then be applied to the presently available consumer tradeline information in the following manner to determine, based on the results of application of the derived models, an estimate of a consumer's size of wallet. Each consumer of interest may be selected based on their falling into one of the categories selected for modeling described above, or may be selected using any of a variety of criteria.

The process 600 continues to step 604 where, for a selected consumer, a paydown percentage over a previous period of time is estimated for each of the consumer's credit accounts. In one embodiment, the paydown percentage is estimated over the previous three-month period of time based on available tradeline data, and may be calculated according to the following formula:

Pay-down %=(The sum of the last three months payments from the account)/(The sum of three month balances for the account based on tradeline data).

The paydown percentage may be set to, for example, 2%, for any consumer exhibiting less than a 5% paydown percentage, and may be set to 100% if greater than 80%, as a simplified manner for estimating consumer spending behaviors on either end of the paydown percentage scale.

Consumers that exhibit less than a 50% paydown during this period may be categorized as revolvers, while consumers that exhibit a 50% paydown or greater may be categorized as transactors. These categorizations may be used to initially determine what, if any, purchasing incentives may be available to the consumer, as described later below.

The process 600, then continues to step 606, where balance transfers for a previous period of time are identified from the available tradeline data for the consumer. The identification of balance transfers are essential since, although tradeline data may reflect a higher balance on a credit account over time, such higher balance may simply be the result of a transfer of a balance into the account, and are thus not indicative of a true increase in the consumer's spending. It is difficult to confirm balance transfers based on tradeline data since the information available is not provided on a transaction level basis. In addition, there are typically lags or absences of reporting of such values on tradeline reports.

Nonetheless, marketplace analysis using confirmed consumer panel and internal customer financial records has revealed reliable ways in which balance transfers into an account may be identified from imperfect individual tradeline data alone. Three exemplary reliable methods for identifying balance transfers from credit accounts, each which is based in part on actual consumer data sampled, are as follows. It should be readily apparent that these formulas in this form are not necessary for all embodiments of the present process and may vary based on the consumer data used to derive them.

A first rule identifies a balance transfer for a given consumer's credit account as follows. The month having the largest balance increase in the tradeline data, and which satisfies the following conditions, may be identified as a month in which a balance transfer has occurred:

The maximum balance increase is greater than twenty times the second maximum balance increase for the remaining months of available data;

The estimated pay-down percent calculated at step 306 above is less than 40%; and The largest balance increase is greater than $1000 based on the available data.

A second rule identifies a balance transfer for a given consumer's credit account in any month where the balance is above twelve times the previous month's balance and the next month's balance differs by no more than 20%.

A third rule identifies a balance transfer for a given consumer's credit account in any month where:

the current balance is greater than 1.5 times the previous month's balance;

the current balance minus the previous month's balance is greater than $4500; and the estimated pay-down percent from step 306 above is less than 30%.

The process 600 then continues to step 608, where consumer spend on each credit account is estimated over the next, for example, three month period. In estimating consumer spend, any spending for a month in which a balance transfer has been identified from individual tradeline data above is set to zero for purposes of estimating the size of the consumer's spending wallet, reflecting the supposition that no real spending has occurred on that account. The estimated spend for each of the three previous months may then be calculated as follows:

Estimated spend=(the current balance−the previous month's balance+(the previous month's balance*the estimated pay-down % from step 604 above).

The exact form of the formula selected may be based on the category in which the consumer is identified from the model applied, and the formula is then computed iteratively for each of the three months of the first period of consumer spend.

Next, at step 610 of the process 600, the estimated spend is then extended over, for example, the previous three quarterly or three-month periods, providing a most-recent year of estimated spend for the consumer.

Finally, at step 612, this in turn may be used to generate a plurality of final outputs for each consumer account (step 314). These may be provided in an output file that may include a portion or all of the following exemplary information, based on the calculations above and information available from individual tradeline data: (i) size of previous twelve month spending wallet; (ii) size of spending wallet for each of the last four quarters; (iii) total number of revolving cards, revolving balance, and average pay down percentage for each; (iv) total number of transacting cards, and transacting balances for each; (v) the number of balance transfers and total estimated amount thereof; (vi) maximum revolving balance amounts and associated credit limits; and (vii) maximum transacting balance and associated credit limit.

After step 612, the process 600 ends with respect to the examined consumer. It should be readily appreciated that the process 600 may be repeated for any number of current customers or consumer prospects.

Figure 7:
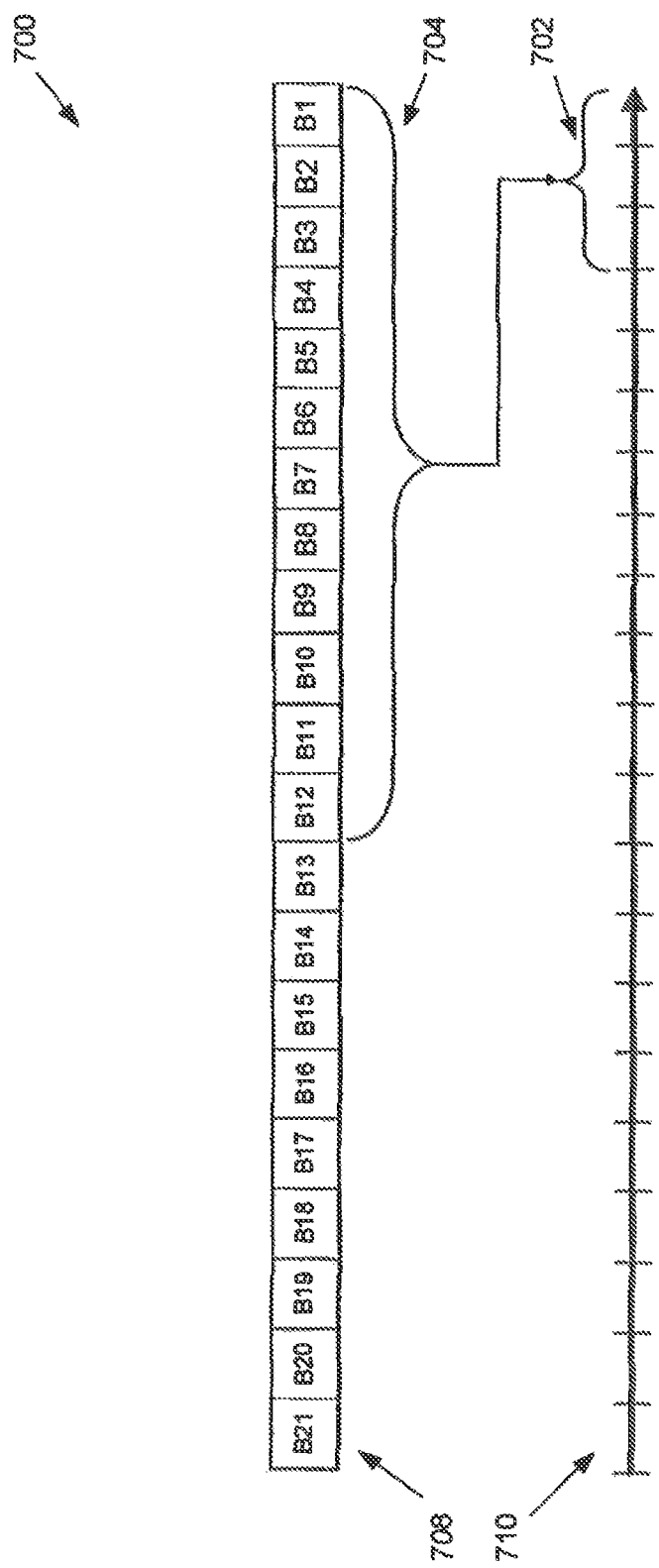
FIGS. 7-10 are exemplary timelines showing the rolling time periods for which individual customer data is examined during the process of FIG. 6.

Referring now to FIGS. 7-10, therein is depicted illustrative diagrams 700-1000 of how such estimated spending is calculated in a rolling manner across each previous three month (quarterly) period. In FIG. 7, there is depicted a first three month period (i.e., the most recent previous quarter) 702 on a timeline 710. As well, there is depicted a first twelve-month period 704 on a timeline 708 representing the last twenty-one months of point-in-time account balance information available from individual tradeline data for the consumer's account. Each month's balance for the account is designated as "B#." B1-B12 represent actual account balance information available over the past twelve months for the consumer. B13-B21 represent consumer balances over consecutive, preceding months.

In accordance with the diagram 700, spending in each of the three months of the first quarter 702 is calculated based on the balance values B1-B12, the category of the consumer based on consumer spending models generated in the process 200, and the formulas used in steps 604 and 606.

Figure 8:
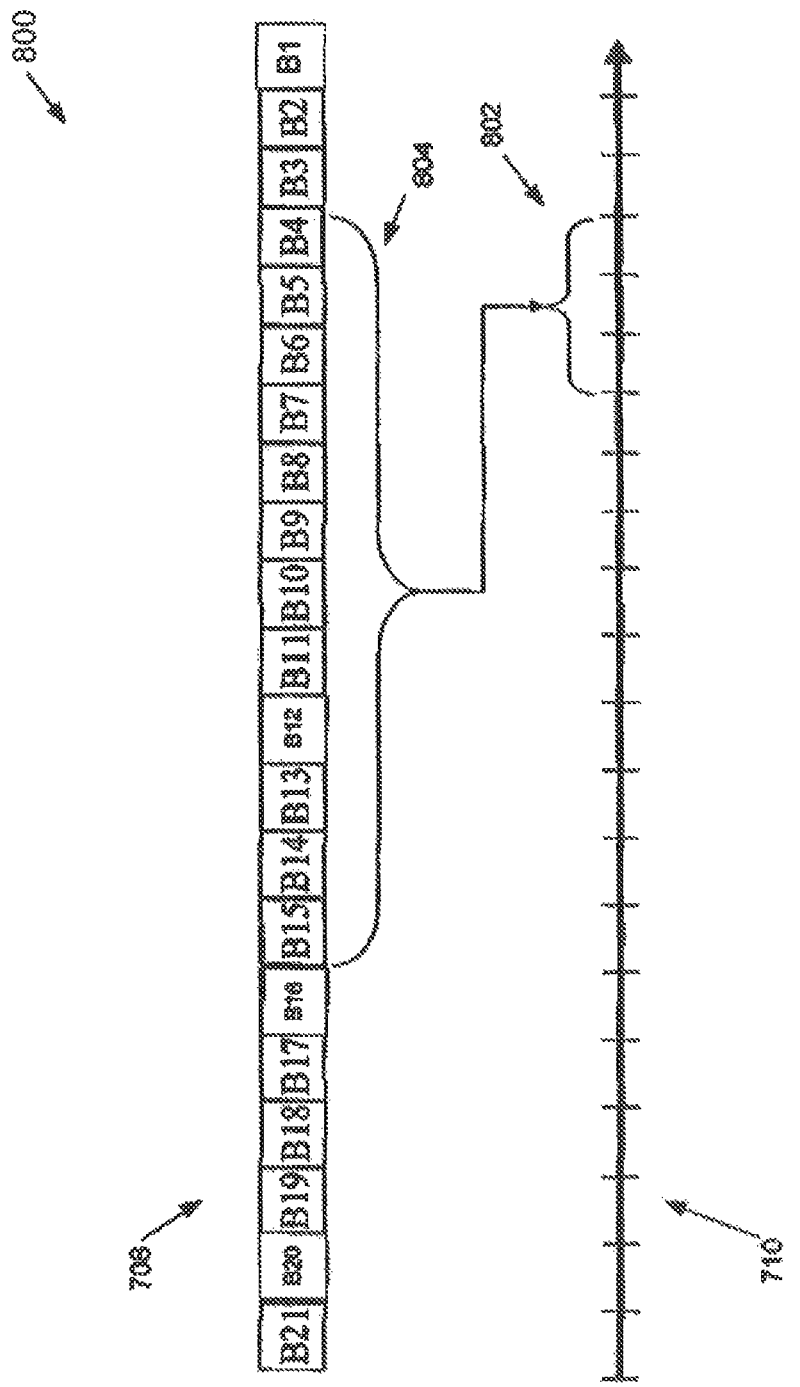

Turning now to FIG. 8, there is shown a diagram 800 illustrating the balance information used for estimating spending in a second previous quarter 802 using a second twelve-month period of balance information 804. Spending in each of these three months of the second previous quarter 802 is based on known balance information B4-B15.

Figure 9:
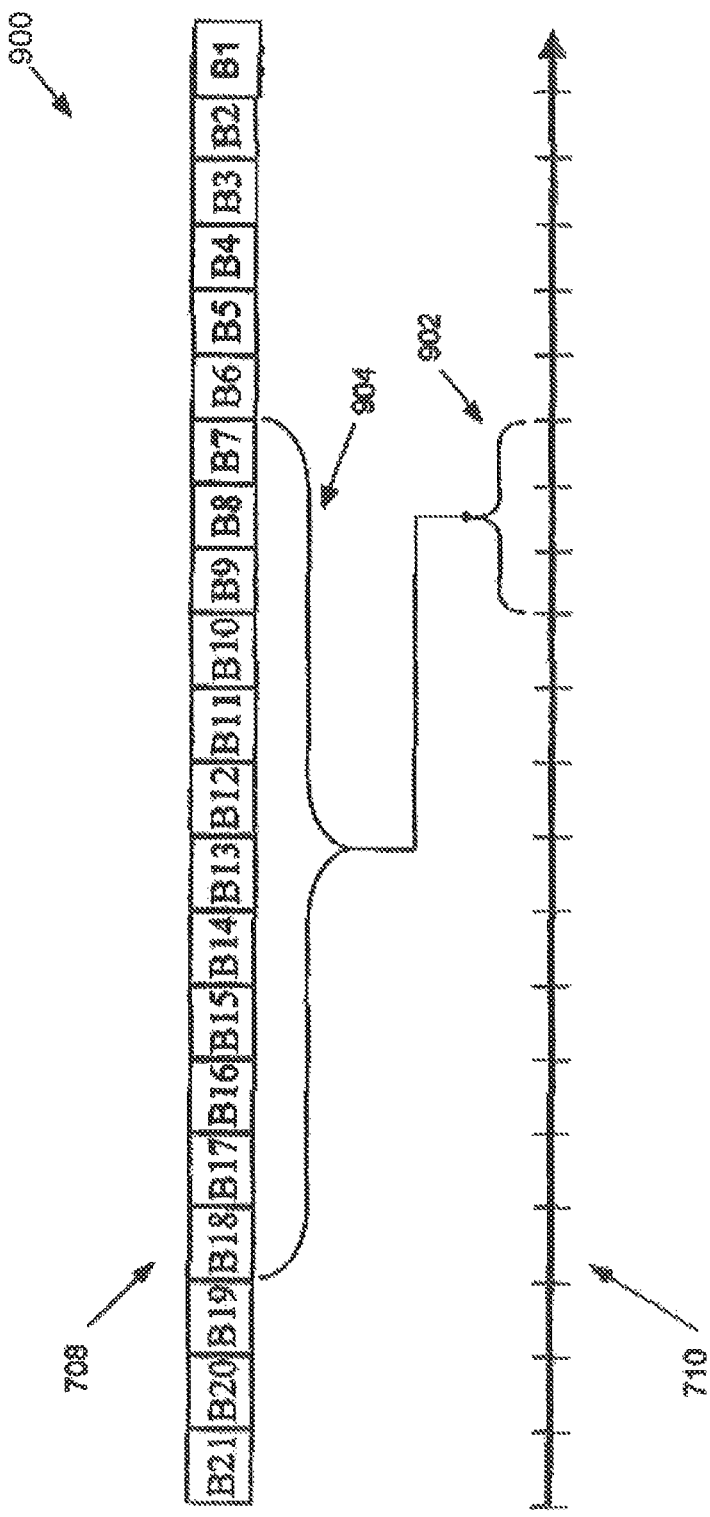

Turning now to FIG. 9, there is shown a diagram 900 illustrating the balance information used for estimating spending in a third successive quarter 902 using a third twelve-month period of balance information 904. Spending in each of these three months of the third previous quarter 902 is based on known balance information B7-B18.

Figure 10:
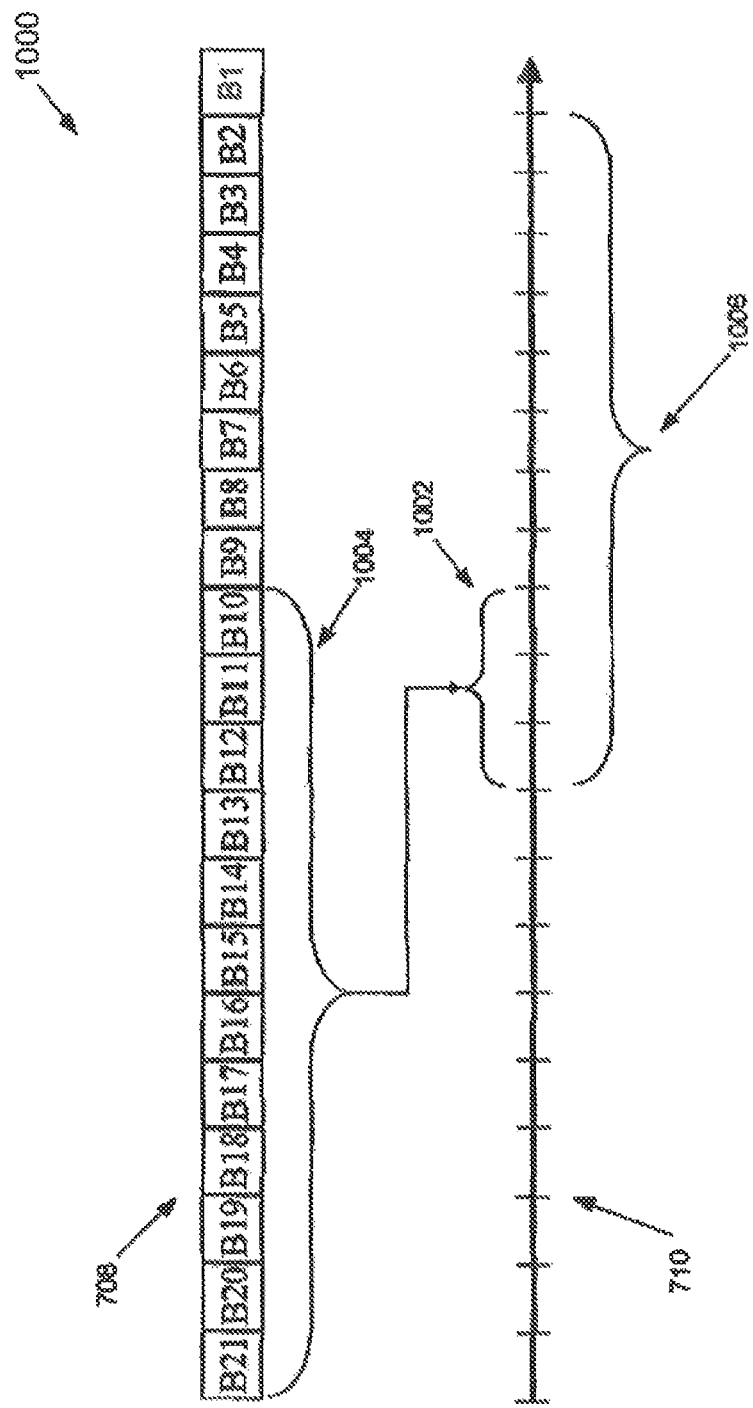

Turning now to FIG. 10, there is shown a diagram 1000 illustrating the balance information used for estimating spending in a fourth previous quarter 1002 using a fourth twelve-month period of balance information 1004. Spending in each of these three months of the fourth previous quarter 1002 is based on balance information B10-B21.

It should be readily appreciated that as the rolling calculations proceed, the consumer's category may change based on the outputs that result, and, therefore, different formula corresponding to the new category may be applied to the consumer for different periods of time. The rolling manner described above maximizes the known data used for estimating consumer spend in a previous twelve month period 1006.

Based on the final output generated for the customer, commensurate purchasing incentives may be identified and provided to the consumer, for example, in anticipation of an increase in the consumer's purchasing ability as projected by the output file. In such cases, consumers of good standing, who are categorized as transactors with a projected increase in purchasing ability, may be offered a lower financing rate on purchases made during the period of expected increase in their purchasing ability, or may be offered a discount or rebate for transactions with selected merchants during that time.

In another example, and in the case where a consumer is a revolver, such consumer with a projected increase in purchasing ability may be offered a lower annual percentage rate on balances maintained on their credit account.

Other like promotions and enhancements to consumers' experiences are well known and may be used within the processes disclosed herein.

Various statistics for the accuracy of the processes 200 and 600 are provided in FIGS. 11-18, for which a consumer sample was analyzed by the process 200 and validated using 24 months of historic actual spend data. The table 1100 of FIG. 11 shows the number of consumers having a balance of $5000 or more for whom the estimated paydown percentage (calculated in step 604 above) matched the actual paydown percentage (as determined from internal transaction data and external consumer panel data).

The table 1200 of FIG. 12 shows the number of consumers having a balance of $5000 or more who were expected to be transactors or revolvers, and who actually turned out to be transactors and revolvers based on actual spend data. As can be seen, the number of expected revolvers who turned out to be actual revolvers (80539) was many times greater than the number of expected revolvers who turned out to be transactors (1090). Likewise, the number of expected and actual transactors outnumbered by nearly four-to-one the number of expected transactors that turned out to be revolvers.

The table 1300 of FIG. 13 shows the number of estimated versus actual instances in the consumer sample of when there occurred a balance transfer into an account. For instance, in the period sampled, there were 148,326 instances where no balance transfers were identified in step 606 above, and for which a comparison of actual consumer data showed there were in fact no balance transfers in. This compares to only 9,534 instances where no balance transfers were identified in step 606, but there were in fact actual balance transfers.

The table 1400 of FIG. 14 shows the accuracy of estimated spending (in steps 608-612) versus actual spending for consumers with account balances (at the time this sample testing was performed) greater than $5000. As can be seen, the estimated spending at each spending level most closely matched the same actual spending level than for any other spending level in nearly all instances.

The table 1500 of FIG. 15 shows the accuracy of estimated spending (in steps 608-612) versus actual spending for consumers having most recent account balances between $1600 and $5000. As can be readily seen, the estimated spending at each spending level most closely matched the same actual spending level than for any other spending level in all instances.

The table 1600 of FIG. 16 shows the accuracy of estimated spending versus actual spending for all consumers in the sample. As can be readily seen, the estimated spending at each spending level most closely matched the same actual spending level than for any other actual spending level in all instances.

The table 1700 of FIG. 17 shows the rank order of estimated versus actual spending for all consumers in the sample. This table 1700 readily shows that the number of consumers expected to be in the bottom 10% of spending most closely matched the actual number of consumers in that category, by 827,716 to 22,721. The table 1700 further shows that the number of consumers expected to be in the top 10% of spenders most closely matched the number of consumers who were actually in the top 10%, by 71,773 to 22,721.

The table 1800 of FIG. 18 shows estimated versus actual annual spending for all consumers in the sample over the most recent year of available data. As can be readily seen, the expected number of consumers at each spending level most closely matched the same actual spending level than any other level in all instances.

Finally, the table 1900 of FIG. 19 shows the rank order of estimated versus actual total annual spending for all the consumers over the most recent year of available data. Again, the number of expected consumers in each rank most closely matched the actual rank than any other rank.

Prospective customer populations used for modeling and/or later evaluation may be provided from any of a plurality of available marketing groups, or may be culled from credit bureau data, targeted advertising campaigns or the like. Testing and analysis may be continuously performed to identify the optimal placement and required frequency of such sources for using the size of spending wallet calculations. The processes described herein may also be used to develop models for predicting a size of wallet for an individual consumer.

Institutions adopting the processes disclosed herein may expect to more readily and profitably identify opportunities for prospect and customer offerings, which in turn provides enhanced experiences across all parts of a customer's life-cycle. In the case of a credit provider, accurate identification of spend opportunities allows for rapid provisioning of card member offerings to increase spend that, in turn, results in increased transaction fees, interest charges and the like. The careful selection of customers to receive such offerings reduces the incidence of fraud that may occur in less disciplined card member incentive programs. This, in turn, reduces overall operating expenses for institutions.

Household Size of Wallet

In addition to determining the size of wallet of a single consumer, the above process may also be used in determining the size of wallet of a given household. Determining the size of wallet of a household allows a financial institution to more accurately estimate the spend opportunity associated with an individual than would be estimated from the individual's size of wallet alone. For example, two example consumers may have the same individual size of wallet. However, one consumer is single and lives alone, but the other consumer is married to a spouse whose size of wallet is twice as big as the second consumer. The second consumer thus has more spending potential than the first, even though they look very similar when standing alone.

Figure 20:
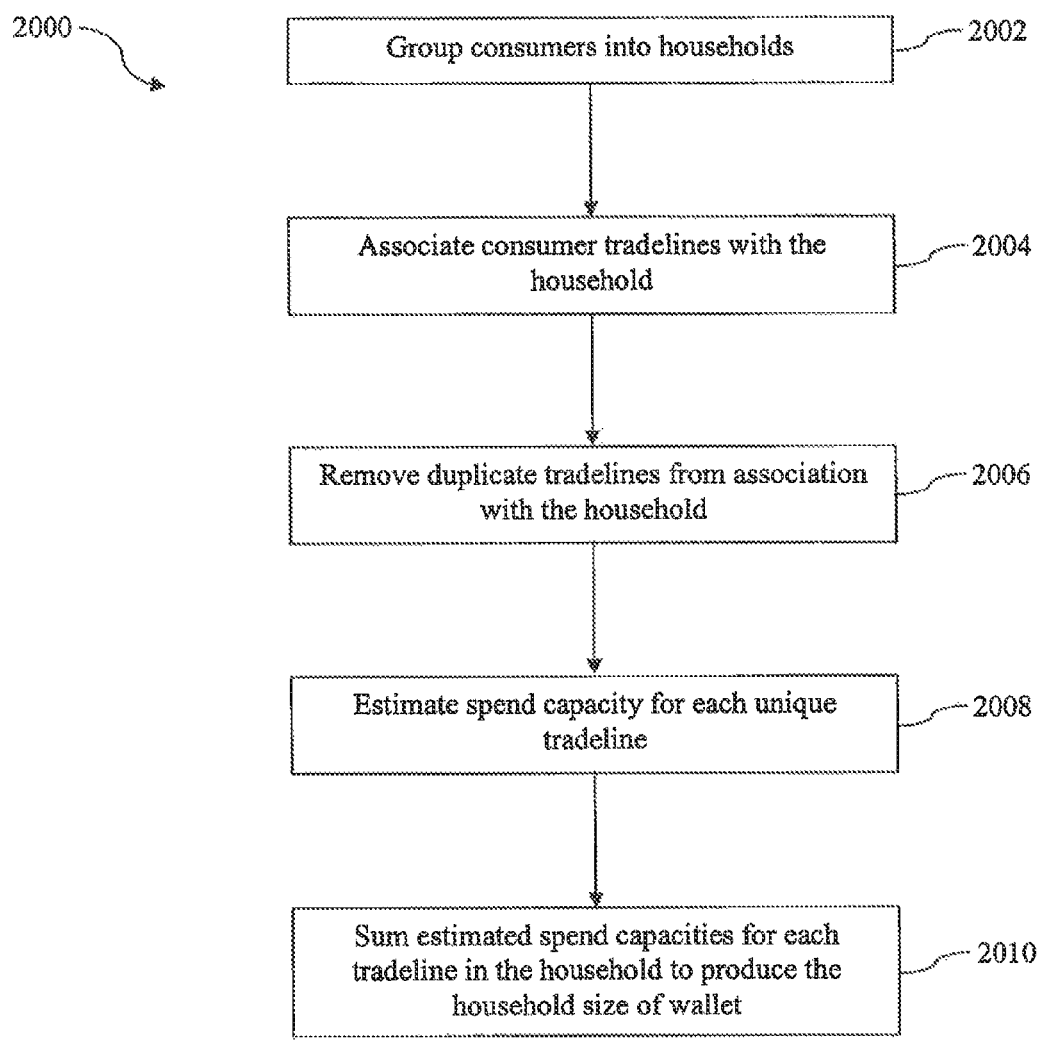
FIG. 20 is a flowchart of an exemplary method for determining a household size of wallet.

FIG. 20 is a flowchart of an exemplary method 2000 of determining the size of wallet of an entire household. In step 2002, individual consumers are grouped into households. A household may include, for example, all people with credit bureau history that live at the same address. Such individuals do not necessarily need to have the same last name. The grouping may exclude certain people, such as those under the age of 18, or those who have opted out of direct marketing campaigns. In addition, address data may not necessarily be current or accurate. Thus, such embodiments that rely solely on grouping consumers at the same address may not be as reliable as further embodiments described herein. In addition, as described below, grouping by residential address may lead to the presence of duplicate tradelines, which may be identified and removed to improve accuracy. Other methodologies, such as those described herein, lessen or eliminate the need for addressing duplicate tradelines.

In step 2004, once individual consumers are grouped into a household, tradelines held by one or more of the consumers in the household are identified and associated with the household. The tradelines may be determined using, for example and without limitation, credit bureau data and internal records of the financial institution.

In step 2006, duplicate tradelines are identified and removed from association with the household, such that only unique trades remain associated with the household. Duplicates occur when the basic user of an account shares a household with a supplemental user of the same account. To identify duplicate tradelines, the history is obtained for every tradeline associated with the household. The history may be limited to a given timeframe, such as the previous 24 months. This history may include, for example and without limitation, account balance and transaction information. The histories of the tradelines are then compared to determine if any tradeline in the household has the same historical performance as another tradeline in the household. If two tradelines are identified as having the same historical performance, one of the tradelines is determined to be a duplicate, and is not considered in the household size of wallet calculation.

In step 2008, an estimated spend capacity for each of the remaining, unique tradelines is calculated based on the balance of the tradeline. The estimated spend capacity may be calculated, for example, as described with respect to method 600 (FIG. 6) above.

In step 2010, the estimated spend capacities of the unique tradelines in the household are summed. The resulting combined spend capacity is output as the household size of wallet. The household size of wallet can then be associated with each individual consumer in the household.

Once individual consumers are tagged with or otherwise identified by their household size of wallet, a financial institution can more accurately categorize the consumers and provide the consumers with more relevant offers. For example, based on the household size of wallet calculated for an existing customer, purchasing incentives may be identified and provided to the existing customer to encourage spend on an existing account. In another example, prospective customers may be targeted based on their own specific household sizes of wallet and/or spend characteristics of other consumers in their household. In this example, a prospective cardholder whose household size of wallet is significantly higher than his individual size of wallet is expected to have high spend and a high response rate to product offers. Similarly, a prospective cardholder that lives in the same household as a high spend, low risk card holder is expected to be high spend and low risk as well. Such targeting encourages spend by prospective cardholders on new accounts.

Categorizing consumers by household type reveals trends which can be used to identify low risk prospects without completing size of wallet analyses for each specific prospect. The household size and mix of consumers therein defines a household type. FIG. 21 is a chart identifying various household types 2102. Each household type 2102 has a particular size 2104 and a particular mix 2106. Size 2104 corresponds to the number of consumers in the household. Mix 2106 corresponds to the number of basic cardholders, supplemental cardholders, and prospective cardholders in the household. Each household type makes up a percentage 2108 of all households.

Figure 22:
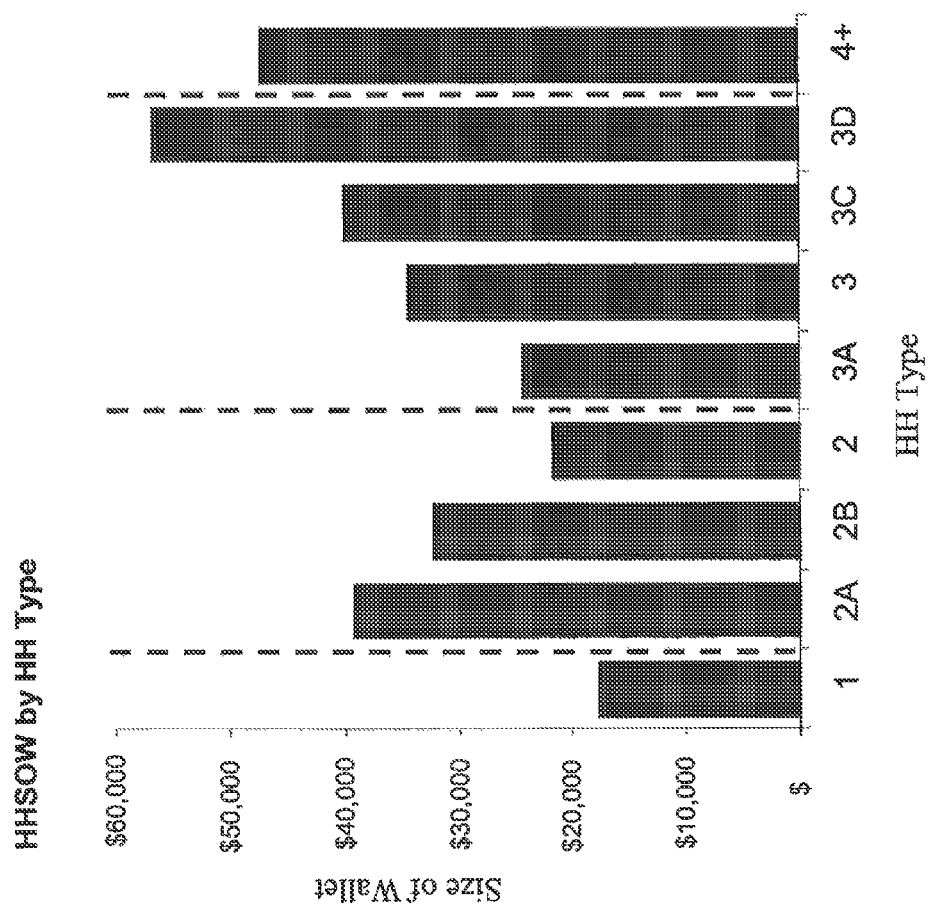
FIG. 22 is a chart illustrating average sizes of wallet by household type.

FIG. 22 illustrates average sizes of wallet by household type. As would be expected, household size of wallet increases as the number of people in a household increases, and depends on the mix of consumers in the household. Of households with two people, for example, those having two basic cardholders (type 2A) tend to have the largest wallet, while, households having one basic cardholder and one prospective cardholder (type 2C) tend to have the smallest wallet. In another example, of households with three people, those having two basic cardholders and one prospective cardholder (type 3C) tend to have the largest wallets (excluding the "other" category), while households having one basic cardholder and two prospective cardholders (type 3A) tend to have the smallest wallets.

By identifying the types of households having the largest wallets, a financial institution can target consumers in those household types with new product offers and/or incentives on existing products to encourage spend with the financial institution by the consumers. For example, the financial institution can target prospective cardholders of all type-2A households with an offer for a new card product that suits their needs, since those cardholders are the most likely to accept such an offer while maintaining a low risk of default.

Figure 23:
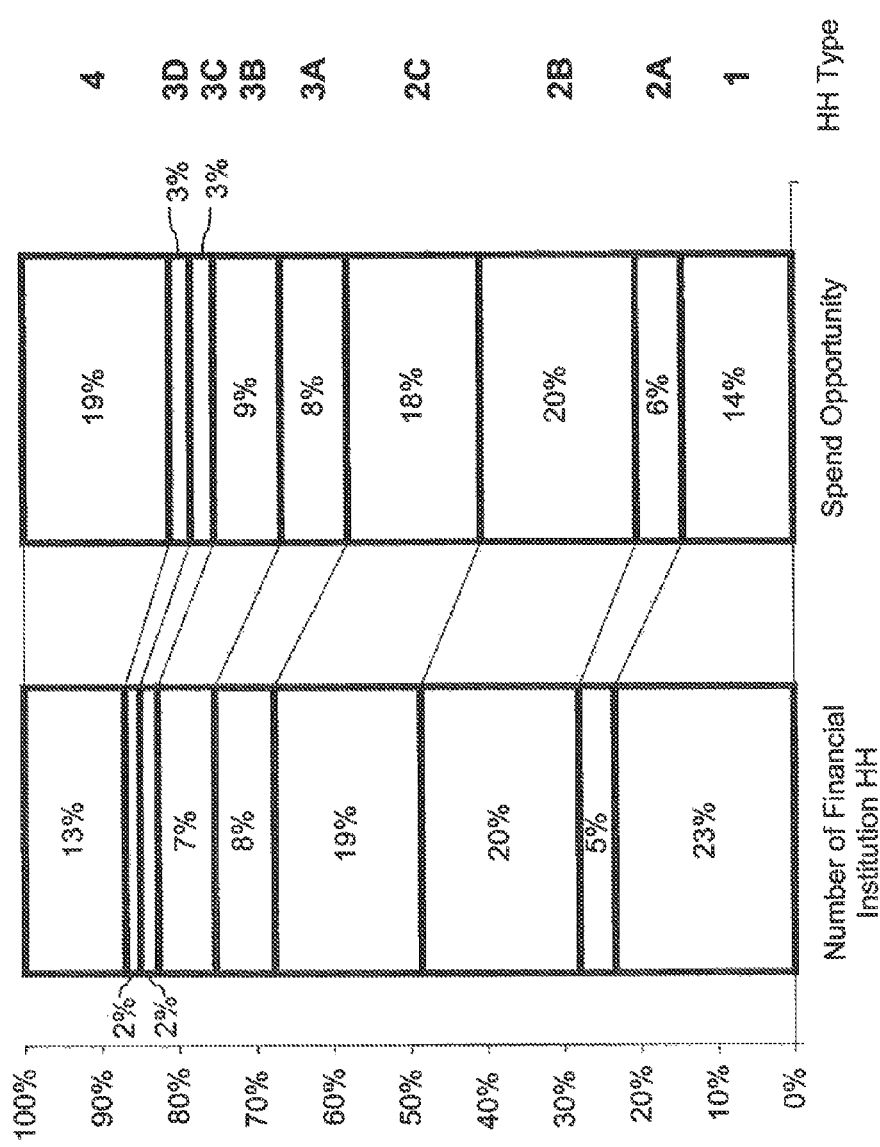
FIG. 23 is a chart illustrating spend opportunity based on an exemplary share of wallet distribution.

Once the size of wallet has been determined for a given household, the share of the household wallet held by a particular financial institution can also be determined. The share of wallet is the percentage of the total size of wallet that is associated with the financial institution and can typically be determined, for example, from the internal records of the financial institution. By identifying households where the financial institution has only a small share of the household size of wallet, the financial institution can determine which households offer the best prospects for spending growth. This is referred to as the spend opportunity. Households having a large spend opportunity can then be targeted for product offers and incentives to increase spend by the consumer with the financial institution. For example, for a financial institution having the exemplary share of household wallet distribution illustrated in FIG. 23, the greatest spend opportunity is available in households having one basic cardholder and one supplemental cardholder (type 2B) and households having one basic cardholder and one prospective cardholder (type 2C).

Identifying Financial Relationships

As described above, the identification of financial relationships may be difficult because credit bureaus at present do not associate tradelines with debtors other than the primary debtor that is identifiable. In addition, grouping consumers solely by physical residential address is a less preferred method of determining a household, as it has the disadvantages described above. Moreover, consumers have financial relationships that transcend physical residential address. For example, a parent may co-sign for a credit card with a child who is a young adult (e.g., a child in college). A child may co-sign an automobile loan for a parent who would not be able to secure such a loan without a co-signor. Unmarried couples may share financial obligations despite maintaining separate residences. Identifying types of financial relationships that extend beyond a shared physical residential address may be used in improving marketing, credit approval decisions, and other financial calculations, a described herein. Thus, improved methods for identifying and analyzing financial relationships are desirable.

Credit bureaus typically receive credit bureau reporting data (e.g., as reported using METRO 2) and populate debtor records associated with the tradeline. For example, a credit bureau reporting data in a METRO 2 container may be received by a credit bureau. The credit bureau may parse the Base Segment to identify the primary debtor and may further parse the J1 or J2 segments to identify a secondary debtor. The credit bureau may further parse the Base Segment to identify a secondary debtor. The credit bureau may then update its records for the primary debtor and update its records pertaining to the secondary debtor, but, conventionally, no linkage between the debtors is made. The credit bureau reporting data (e.g., the METRO 2 container) is conventionally purged after the debtor records are updated. Thus, one cannot query for all debtors associated with that tradeline by using the tradeline data. Stated another way, one may not identity all debtors associated with a given tradeline. One could not identify financial relationships, then, from present credit bureau records.

In various embodiments, a credit bureau may receive credit bureau reporting data and create a linkage (also referred to as a link) between the tradeline and the debtors associated with the tradeline. Such a linkage may take the form of a combination (e.g., concatenation), of two or more fields from a tradeline. Stated another way, the linkage may be a numeric or alphanumeric representation of the tradeline that is unique or likely unique to that tradeline. In this manner, the linkage may be produced from data related to the tradeline that are static over time (such as trade open date), but the linkage may also be produced from data related to the tradeline that is dynamic over time (such as the high credit field). In various embodiments, a linkage may comprise a combination or concatenation of subscriber code and account number. For example, a tradeline with subscriber code "1234" and account number "567" may be concatenated to produce the linkage "1234567." In that regard, it is likely that, across a tradeline, very few if any will have the same linkage value. Other fields that may be used in the linkage may be the last update date, trade open date, and balance. In various embodiments, to increase the likelihood that the linkage will be unique for each tradeline and/or to assist in obscuring the underlying data, a hash function, cryptographic function, or other similar function may be used to transform the linkage into another form. Thus, in various embodiments, a cryptographic function is used to "hide" the subscriber code and account number in a linkage such that one could not, without possession of the cryptographic function, obtain the unencrypted linkage.

Accordingly, the link could be used to query for tradelines associated with two or more debtors. For example, a reference or pointer may be associated with the tradeline that references the primary and secondary debtor. In that regard, a data store may be queried to identify a tradeline and then associate primary and secondary debtors. Accordingly, given a tradeline, one may find the associated debtors.

By retaining a linkage between a primary and a secondary debtor and a tradeline obtained from credit reporting data, it is understood that such linkage is of high accuracy. Stated another way, one may be nearly certain that the tradeline is, in fact, associated with the primary debtor and the secondary debtor, as the only source of inaccuracy may be from the entity that is providing the credit reporting data. Thus, the linkage contained in the credit reporting data may be considered definitive.

Figure 24:
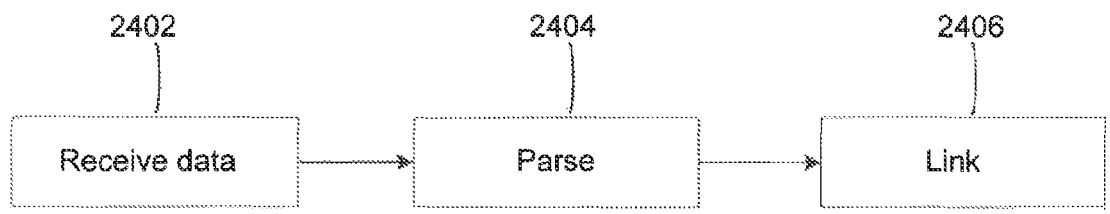
FIG. 24 illustrates a method of linking in accordance with various embodiments.

With reference to FIG. 24, method 2400 is illustrated. Credit reporting data may be received in step 2402. Credit reporting data may be in a METRO 2 container. The credit reporting data may be parsed in step 2404. Parsing may occur using any suitable method or parser. In embodiments where a METRO 2 container is used, the parsing may be of the Base Segment, the J1 Segment, the J2 Segment, or combinations thereof. The Base Segment, the J1 Segment, or the J2 Segment may contain data relating to a secondary debtor associated with the tradeline reported in the METRO 2 container, such as co-debtor name, address, and age, along with data relating to one or more additional debtors. The Base Segment may contain a generation code (GEN code) that contains information on the number of co-debtors on a tradeline. The J1 and/or J2 segments may contain similar information. It should be understood that the METRO 2 container may have an analog provided in an XML format, and thus the disclosure herein is not limited to a METRO 2 container that comprises a delimited or fixed width file. A link may be created in step 2406 that links the tradeline with one or more co-debtors derived from parsing step 2404. For example, step 2406 may comprise obtaining the subscriber code and the account number from the METRO 2 container. Step 2046 may further comprise combining (e.g., concatenating) the subscriber code and the account number to create a linkage. Optionally in step 2046, the linkage may be encrypted or otherwise transformed to a different data value.

Figure 28:
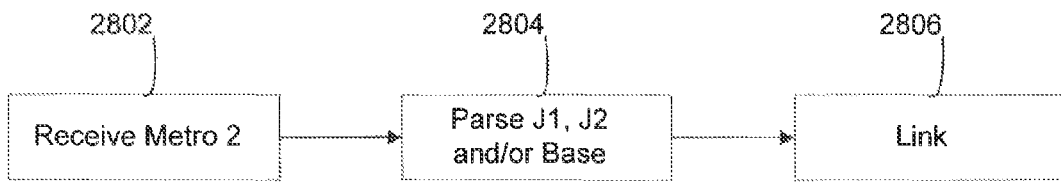
FIG. 28 illustrates a method of parsing in accordance with various embodiments.

With reference to FIG. 28, method 2800 is illustrated. A METRO 2 container may be received in step 2802. Parsing of the METRO 2 container, including parsing the J1 Segment, the J2 Segment, and/or the Base Segment is performed in step 2804. A link may be created in step 2806 that links the tradeline described in the METRO 2 container with one or more co-debtors derived from parsing step 2804.

In various embodiments, however, credit bureau data may exist in a data store that does not contain such link. For example, this may occur where the credit bureau did not retain the linkage between a tradeline and a primary and secondary debtor. Thus, other methods may be employed to identify financial relationships with a higher degree of accuracy.

In various embodiments, a tradeline may be used to produce a fingerprint and the fingerprint may be used to query for associated debtors. A tradeline contains tradeline data, such as original balance amount, current balance, payment history, origination date, credit issuer name, and other like data. Two or more data fields from the tradeline data may be selected for the creation of a fingerprint. A fingerprint, such as a digital fingerprint, is a mathematical representation of the input data. A fingerprint algorithm, similar to a hash function, for example, may be used to insure that different input data produces a different fingerprint. Thus, a fingerprint algorithm may be used to make sure that no two fingerprints are the same, unless the input data is the same. Fingerprint algorithms may be used and/or hash functions, checksum functions, and randomization functions, among others.

For example, debtor A may have a tradeline with credit issuer Bank X, originated on Jul. 29, 2006, having an opening balance of thirty thousand dollars and a current balance of ten thousand dollars. A fingerprint algorithm may be used to produce a digital output (i.e., a number) that represents a fingerprint of these inputs. The tradelines of other debtors may then be queried. It may then be found that debtor B and debtor C have tradelines with the same fingerprint. Thus, it is likely that debtor B and debtor C are associated with the tradeline and the records associated with debtor B and debtor C may be updated to reflect the association. In various embodiments, multiple fingerprints may be made using varying input data fields. In the above example, an alternate fingerprint may be created using credit issuer Bank X, originated on Jul. 29, 2006, having an opening balance of thirty thousand dollars, a current balance of ten thousand dollars, and the presence of a missed or late payment in March 2009. Querying the alternate fingerprint may return only debtor B, thus indicating that debtor C may have a similar, but not identical, tradeline as debtors A and B. The use of one or more alternate fingerprints may improve accuracy.

Figure 26:
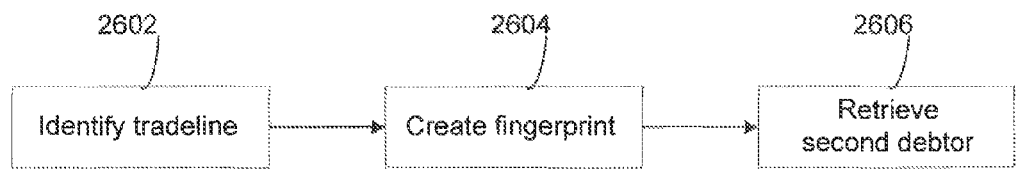
FIG. 26 illustrates an additional method of linking in accordance with various embodiments.

For example, with reference to FIG. 26, method 2600 is illustrated. A tradeline may be identified in step 2602. A fingerprint may be generated for the tradeline in step 2604. The fingerprint may be generated by selecting one or more data points from the tradeline and processing the data points through a fingerprint algorithm to produce a digital fingerprint. Step 2604 may be generated for many tradelines in a data store for a number of debtors. The digital fingerprint may then be used to retrieve other debtors who may have tradelines with identical fingerprints in step 2604.

Use of a fingerprint may be highly accurate, though not as accurate as definitive knowledge of a link such as would be obtained in credit reporting data. Thus, use of a fingerprint may be performed on a data store containing credit bureau data to identify common tradelines and link co-debtors together. Then, upon receipt of credit reporting data on the tradeline, the credit reporting data may be parsed to reveal one or more associated debtors. The credit reporting data may be compared to the linkages created through the use of a fingerprint. Linkages may be modified (i.e., deleted or edited) in response to the credit reporting data. This improves accuracy, as well as provides an accuracy metric relative to the type of fingerprint methodology used. For example, the accuracy metric may comprise the percentage of linkages found in credit reporting data from the total number of linkages identified by use of a fingerprint.

Linkages between debtors may reveal a debtor entity. A debtor entity may be defined as one or more persons that are liable on a tradeline (i.e., co-signer, etc). For example, a married couple comprising debtor A and debtor B form a debtor entity. The debtor entity may then be queried against, for example, a data store comprising credit bureau data to return all tradelines associated with the debtor entity. The returned data may be referred to as household tradeline data.

In various embodiments, expanded household tradeline data includes tradelines associated with debtor A and debtor B, but also tradelines associated with debtor A only and debtor B only. The expanded household tradeline data thus provides a more comprehensive picture of the union of debtor A and debtor B, whereas household tradeline data provides an insight into how debtor A and debtor B behave as a debtor entity. In various embodiments, household tradeline data and expanded household tradeline data may comprise data from debtors that do not reside at the same physical address. Thus, the term "household" in this term is used for convenience only.

Figure 25:
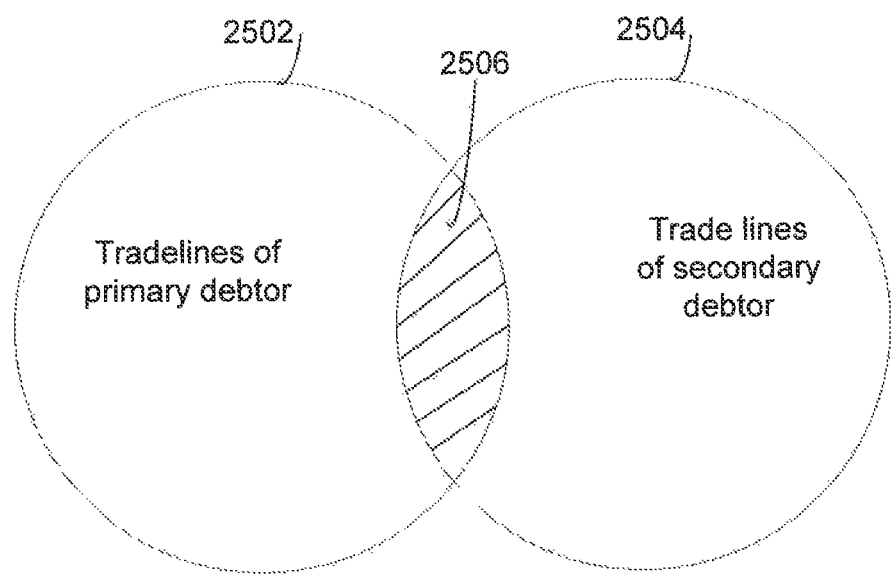
FIG. 25 illustrates a Venn diagram of debtor tradelines in accordance with various embodiments.

To demonstrate household tradeline data and expanded household tradeline data and with reference to FIG. 25, Venn diagram 2500 is shown. Area 2502 includes all tradelines of a first debtor. Area 2504 includes all tradelines of a second debtor. Area 2506 shows the intersection of area 2502 and area 2504, representing the household tradeline data, or the tradelines that are associated with both the first debtor and second debtor. The union of area 2502 and 2504 (which includes area 2506), may comprise expanded household tradeline data.

Thus, it may be found that household tradeline data provides a picture of stable debtors with little to no negative payment histories but expanded household tradeline data may show that one or more of the underlying debtors has separate tradelines that have a negative history. This may be the case for a couple where one or more spouses has previously divorced. The divorced spouse may have negative credit history on separate accounts but positive credit history on accounts where joined by the present spouse.

In various embodiments, debtors that are associated with a tradeline may have different physical residential addresses. The demographic data from the different residential addresses may be obtained to improve various activities, such as marketing and collection efforts. Demographic data may include ZIP+4 of residential address, census data (e.g., number of people, income levels, etc), and data relating to the number and types of businesses in the ZIP+4 or other geographic descriptor (e.g., number of big box discount stores, number of liquor stores, pawn shops, adult entertainment venues, non-bank check cashing stores, car title loan stores, non-bank, unsecured loan stores, number of public housing projects, number of luxury goods retailers, etc). Demographic data may be used as described, below.

To further collect data relating to financial relationships, contact information may be collected from various debtors, such as through a social networking site, a cloud service (e.g., ICLOUD) or through a mobile smartphone application (an "app"). The collection of contact information may be merged with debtor records to provide further information regarding a debtor's co-debtors and the familial or marital relationship. For example, it a debtor stores a contact labeled "wife" and the debtor is also linked to a mortgage tradeline associated with the person labeled "wife," it may be inferred that the co-debtor is the debtor's wife. In various embodiments, a debtor's contact list may contain contacts that do not have existing tradelines such as, for example, minor children. Such contacts may be referred to as unmatched debtor records. The relationship to the debtor may preserved in a record for the unmatched debtor. At a later time, when the unmatched debtor opens a tradeline (e.g., a minor child reaches adulthood and open a transaction account), the unmatched debtor may be linked to the debtor.

Uses of Financial Relationship Information

Outputs of the disclosed financial relationship identification (the "FRI model") can be used in various analytics and may provide improved marketing and collection activities, among other activities.

Figure 27:
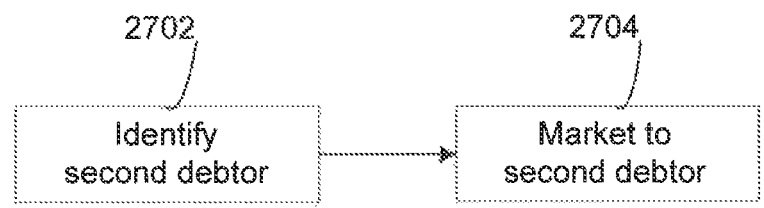
FIG. 27 illustrates a method of marketing in accordance with various embodiments.

A method of marketing 2700 is illustrated in FIG. 27. A second debtor on a tradeline associated with a first debtor may be identified using one or more of the methods disclosed above in step 2702. The second debtor may then be the subject of marketing in step 2704. The products or services marketed may be similar to the tradeline associated with a first debtor. In various embodiments, however, internal data is obtained relating to the first debtor and/or the second debtor. The internal data may be analyzed to determine the spending behaviors of the first debtor and/or the second debtor. Thus, the spending behavior of the first debtor may be used to tailor the marketing to the second debtor. The marketing of step 2704 may be distributed to the first debtor yet targeted to the second debtor. For example, if internal data is used to show that the second debtor shops at a particular store every week, marketing material promoting the store or the store's competitor may be sent to the first debtor with the intention that the first debtor will be aware of the second debtor's affinity for the store (or the second debtor's desire to try a new competing store) and share it with the second debtor. In this manner, the social networking power may amplify the marketing message. Stated another way, marketing is more likely to result in a sale when it originates from a person the marketing target knows. In this case, co-debtors often have a close relationship, such as married couples, parents and children, and other forms of relationships. The marketing may comprise an offer to add the second debtor to a tradeline of the first debtor. For example, where a first debtor and a second debtor are linked to a mortgage tradeline, it may be found that first debtor has a tradeline for a transaction account from credit issuer A and second debtor has a tradeline for a transaction account from credit issuer B. Credit issuer A may be then provide an incentive for the first debtor to add the second debtor to the first debtor's transaction account. This may be especially useful if the second debtor's size of wallet is large relative to the first debtor and/or if the credit issuer has a small share of wallet relative to the second debtor.

Figure 29:
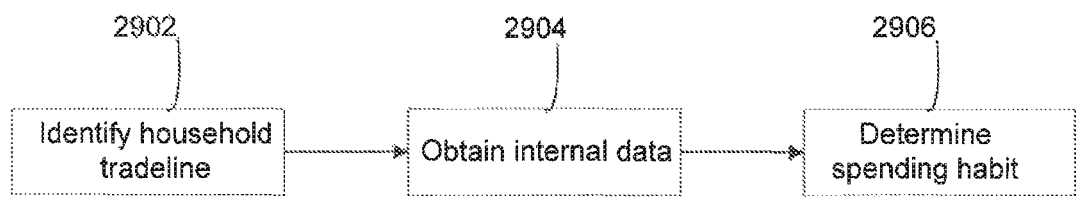
FIG. 29 illustrates a method of using internal data in accordance with various embodiments.

A method of using internal data 2900 is shown in FIG. 29. As discussed above, one may identify a household tradeline data set or an expanded household tradeline data set in step 2902. One may then obtain internal data relating to the debtors in the household data set. Spending patterns may be determined in step 2906 using the internal data. In this regard, a spending profile may be built. The spending profile may be used to tailor marketing to the underlying debtors on a household tradeline data set or an expanded household tradeline data set. For example, a "daily deal" type campaign may be submitted to the debtors who are linked by a tradeline for a daily deal in the area of a shared residence. The daily deal may be a business or a type of business frequented by one or more of the debtors. For example, a pizza shop or a coffee shop that competes with a similar business frequented by one or more the debtors may want to promote itself by offering such a daily deal in a targeted manner.

Use of internal data may be especially useful with financial relationships that extend between two people that do not reside at the same physical address. For example, it may be found that a parent shares a transaction account with a child who attends college in a different state or region from the parent. Thus, marketing to the child will be age appropriate (e.g., youth oriented brands, bars/nightclubs, and youth oriented entertainment) and in accordance with the spending patterns of both the child and parent. Thus, a child with a parent who has a large size of wallet may be marketed with more upscale goods and services. A child with a parent who dines out often may thus be accustomed to dining out, and may thus be the subject of restaurant marketing. On the other hand, a child who has a parent that purchases more groceries and dines out less may be accustomed to such a lifestyle and may be the subject of marketing for grocery stores that match the parent's grocery shopping habits (i.e., children of parents who shop at WHOLE FOODS will receive marketing for TRADER JOE'S or SPROUTS or WHOLE FOODS). Complimentary goods and services may also be marketed to the child. In addition, a child's transaction account may be linked to a parent. The child's spending patterns may the be used to market goods and services to the parent, in addition to use of the parent's demographic information and internal data associated with the parent.

Where two debtors are associated with the same tradeline and do not reside in the same physical address, demographic data for each debtor may be used in marketing, collection efforts, and other efforts. For example, when a primary debtor lives in a different type of area than the secondary debtor (e.g., the secondary debtor live in a ZIP+4 with a high number of businesses associated with risky behaviors), the primary debtor may be deemed to be less creditworthy. On the other hand, the secondary debtor may be deemed to be more creditworthy, as the secondary debtor has a relationship with a more financially stable person. In addition, local businesses may be market to the secondary debtor because of the financial relationship with the first debtor.

A size of wallet calculation, as described herein, may be performed on debtors who share one or more tradelines. In this manner, a size of wallet of a debtor entity may be determined. Marketing activities may be performed in response to this calculation. In addition, collection efforts may be tailored in response to this calculation. For example, if a first debtor is not current on a tradeline but it is found that the first debtor is linked to a second debtor that has a high size of wallet or otherwise has a good credit history, aggressive collection efforts may be warranted against the first debtor. In this manner, it may be expected that the first debtor will seek to further the financial relationship with the second debtor by asking the second debtor for help with respect to the tradeline in collections. In addition, the first debtor may use a credit line already shared with the second debtor to settle the tradeline in collections. For example, the first debtor may use a home equity line of credit secured by the home of the second debtor to settle the tradeline in collections. However, if the second debtor has a low size of wallet or has negative credit history, aggressive collection efforts may not result in a recovery of substantial funds.

A credit score may be derived for a debtor entity based upon either a household tradeline data set or an expanded household tradeline data set. The credit score may be formulated to be forward-looking, in that it is useful in predicting default on future debt obligations, or it may be backward-looking in that it is useful in predicting default on existing debt obligations. Predicting default on future debt obligations may be useful in making credit approval decisions. Predicting default on existing debt obligations may be useful in the buying or selling of debt obligations and/or securities derived from the same.

The credit score may be derived using any suitable methodology. The credit score may be based on either the household tradeline data set or an expanded household tradeline data set. In this regard, as described above, it may be found that certain underlying debtors do not meet debt obligations they have alone but do meet debt obligations they share with others. Thus, a debtor entity may be relatively creditworthy while one or more of the constituent debtors of the debtor entity may not be creditworthy.

A credit score that is predictive of default on existing debt obligations may be useful in the buying and selling of debt obligations. For example, an installment loan such as automobile loans may be bundled as an asset-back security, as mortgage loans may be as well. A purchaser of an asset back security interest may want to assess the stability of the underlying debt obligations. The use of a credit score may assist in that regard and the added insight relating to shared or linked debt obligations may improve the accuracy of the credit score.

Credit approval decisions may be based, at least in part, on a credit score as discussed above or by household tradeline data set or an expanded household tradeline data set. Credit approval decisions may be for a new transaction account, a credit limit increase on an exiting transaction account, a mortgage loan, an automobile loan, a home equity loan, or a student loan.

Uses of Financial Relationship Information by Industry

Outputs of the FRI model can be used in any business or market segment that extends credit or otherwise evaluates the creditworthiness of a particular consumer. In various embodiments, these businesses will be referred to herein as falling into one of three categories: financial services companies, retail companies, and other companies.

The business cycle in each category may be divided into three phases: acquisition, retention, and disposal. The acquisition phase occurs when a business is attempting to gain new consumers. The acquisition phase includes, for example, targeted marketing, determining what products or services to offer a consumer, deciding whether to lend to a particular consumer and what the line size or loan should be, and deciding whether to buy a particular loan. The retention phase occurs after a consumer is already associated with the business. In the retention phase, the business interests shift to managing the consumer relationship through, for example, consideration of risk, determination of credit lines, cross-sell opportunities, increasing business from that consumer, and increasing the company's assets under management.

The disposal phase is entered when a business wishes to dissociate itself from a consumer or otherwise end the consumer relationship. The disposal phase can occur, for example, through settlement offers, collections, and sale of defaulted or near-default loans.

Financial services companies include, for example: banks and other lenders, mutual fund companies, financiers of leases and sales, life insurance companies, online brokerages, credit issuers, and loan buyers.

Banks and lenders can utilize the FRI model in all phases of the business cycle. One exemplary use is in relation to home equity loans and the rating given to a particular bond issue in the capital market. The FRI model would apply to home equity lines of credit and automobile loans in a similar manner.

For example, if the holder of a home equity loan borrows from the capital market, the loan holder issues asset-backed securities ("ABS"), or bonds, which are backed by receivables. The loan holder is thus an ABS issuer. The ABS issuer applies for an ABS rating, which is assigned based on the credit quality of the underlying receivables. One of skill in the art will recognize that the ABS issuer may apply for the ABS rating through any application means without altering the spirit and scope of the present invention. In assigning a rating, the rating agencies weigh a loan's probability of default by considering the lender's underwriting and portfolio management processes. Lenders generally secure higher ratings by credit enhancement. Examples of credit enhancement include over-collateralization, buying insurance (such as wrap insurance), and structuring ABS (through, for example, senior/subordinate bond structures, sequential pay vs. pari passu, etc.) to achieve higher ratings. Lenders and rating agencies take the probability of default into consideration when determining the appropriate level of credit enhancement.

During the acquisition phase of a loan, lenders may use the FRI model to improve their lending decisions. Before issuing the loan, lenders can evaluate a consumer's risk of default using the consumer's associations with various other lenders. Evaluation leads to fewer bad loans and a reduced probability of default for loans in the lender's portfolio. A lower probability of default means that, for a given loan portfolio that has been originated using the FRI model, either a higher rating can be obtained with the same degree of over-collateralization, or the degree of over-collateralization can be reduced for a given debt rating. Thus, using the FRI model at the acquisition stage of the loan reduces the lender's overall borrowing cost and loan loss reserves.

During the retention phase of a loan, the FRI model can be used to track a consumer's varying degree of risk. Based on the FRI outputs, the lender can make various decisions regarding the consumer relationship. For example, a lender may use the FRI model to identify borrowers who become more likely to default via the borrowers' association with other lenders. The credit lines of those borrowers which have not fully been drawn down can then be reduced. Selectively revoking unused lines of credit may reduce the probability of default for loans in a given portfolio and reduce the lender's borrowing costs. Selectively revoking unused lines of credit may also reduce the lender's risk by minimizing further exposure to a borrower that may already be in financial distress.

During the disposal phase of a loan, the FRI model enables lenders to better predict the likelihood that a borrower will default. Once the lender has identified consumers who are in danger of default, the lender may select those likely to repay and extend settlement offers. Additionally, lenders can use the FRI model to identify which consumers are unlikely to pay and those who are otherwise not worth extending a settlement offer.

The FRI model allows lenders to identify loans with risk of default, allowing lenders, prior to default, to begin anticipating a course of action to take if default occurs. Because freshly defaulted loans fetch a higher sale price than loans that have been non-performing for longer time periods, lenders may sell these loans earlier in the default period, thereby reducing the lender's costs.

Financiers of leases or sales, such as automobile lease or sale financiers, can benefit from FRI outputs in much the same way as a bank or lender, as discussed above. In typical product financing, however, the amount of the loan or lease is based on the value of the product being financed. Therefore, there is generally no credit limit that needs to be revisited during the course of the loan. As there is no credit limit to be revisited, the FRI model is most useful to lease/sales finance companies during the acquisition and disposal phases of the business cycle.

Just as the FRI model can help loan holders determine that a particular loan is nearing default, loan buyers can use the model to evaluate the quality of a prospective purchase during the acquisition phase of the business cycle. Evaluation assists the loan buyers in avoiding or reducing the sale prices of loans that are in likelihood of default based on the consumer's association with other lenders.

Aspects of the retail industry for which the FRI model would be advantageous include, for example: retail stores having private label cards, on-line retailers, and mail order companies.

There are two general types of credit and charge cards in the marketplace today: multipurpose cards and private label cards. A third type of hybrid card is emerging. Multipurpose cards are cards that can be used at multiple different merchants and service providers. For example, American Express, Visa, Mastercard, and Discover are considered multipurpose card issuers. Multipurpose cards are accepted by merchants and other service providers in what is often referred to as an "open network." Transactions are routed from a point-of-sale ("POS") through a network for authorization, transaction posting, and settlement.

A variety of intermediaries play different roles in the process. These include merchant processors, the brand networks, and issuer processors. An open network is often referred to as an interchange network. Multipurpose cards include a range of different card types, such as charge cards, revolving cards, and debit cards, which are linked to a consumer's demand deposit account ("DDA") or checking account.

Private label cards are cards that can be used for the purchase of goods and services from a single merchant or service provider. Historically, major department stores were the originators of private label cards. Private label cards are now offered by a wide range of retailers and other service providers. These cards are generally processed on a closed network, with transactions flowing between the merchant's POS and its own backoffice or the processing center for a third-party processor. These transactions do not flow through an interchange network and are not subject to interchange fees.

Recently, a type of hybrid card has evolved. A hybrid card, when used at a particular merchant, is that merchant's private label card, but when used elsewhere, becomes a multipurpose card. The particular merchant's transactions are processed in the proprietary private label network. Transactions made with the card at all other merchants and service providers are processed through an interchange network.

Private label card issuers, in addition to multipurpose card issuers and hybrid card issuers, can apply the FRI model in a similar way as described above with respect to credit card companies. Knowledge of a consumer's association with other lenders, coupled with FRI outputs, could be used by card issuers to improve performance and profitability across the entire business cycle.

Online retail and mail order companies can use the FRI model in both the acquisition and retention phases of the business cycle. During the acquisition phase, for example, the companies can base targeted marketing strategies on FRI outputs.

Targeted marketing could substantially reduce costs, especially in the mail order industry, where catalogs are typically sent to a wide variety of individuals. During the retention phase, companies can, for example, base cross-sell strategies or credit line extensions on FRI outputs.

Types of companies which also may make use of the FRI model include, for example and without limitation: the gaming industry, communications providers, and the travel industry.

The gaming industry can use the FRI model in, for example, the acquisition and retention phases of the business cycle. Casinos often extend credit to their wealthiest and/or most active players, also known as "high rollers." The casinos can use the FRI model in the acquisition phase to determine whether credit should be extended to an individual. Once credit has been extended, the casinos can use the FRI model to periodically review the consumer's risk of default.

Communications providers, such as telephone service providers, often contract into service plans with their consumers. In addition to improving their targeted marketing strategies, communications providers can use the FRI outputs during the acquisition phase to determine the risk of default on a service contract associated with a potential consumer.

Members of the travel industry can make use of the FRI outputs in the acquisition and retention stages of the business cycle. For example, a hotelier typically has a brand of hotel that is associated with a particular "star-level" or class of hotel. In order to capture various-market segments, hoteliers may be associated with several hotel brands that are of different classes. During the acquisition phase of the business cycle, a hotelier may use the FRI outputs to target individuals that have appropriate spend capacities for various classes of hotels. During the retention phase, the hotelier may use the FRI outputs to determine, for example, when a particular individual's risk of default decreases. Based on that determination, the hotelier can market a higher class of hotel to the consumer in an attempt to convince the consumer to upgrade.

One of skill in the relevant art(s) will recognize that many of the above described FRI applications may be utilized by other industries and market segments without departing from the spirit and scope of the present invention. For example, the strategy of using FRI to model an industry's "best consumer" and targeting individuals sharing characteristics of that best consumer can be applied to nearly all industries. FRI data can also be used across nearly all industries to improve consumer loyalty by reducing the number of payment reminders sent to responsible accounts.

Responsible accounts include those who are most likely to pay even without being contacted by a collector. The reduction in reminders may increase consumer loyalty, because the consumer will not feel that the lender or service provider is unduly aggressive. The lender's or service provider's collection costs are also reduced, and resources are freed to dedicate to accounts requiring more persuasion.

Additionally, the FRI model may be used in any company having a large consumer service call center to identify specific types of consumers. Transcripts are typically made for any call from a consumer to a call center. These transcripts may be scanned for specific keywords or topics, and combined with the FRI model to determine the consumer's characteristics. For example, a bank having a large consumer service center may scan service calls for discussions involving bankruptcy. The bank could then use the FRI model with the indications from the call center transcripts to evaluate the consumer.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/ CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular dataset; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts or devices, a transponder and reader in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    receiving, at a computer-based system for credit data analysis comprising a processor and a tangible, non-transitory memory, credit reporting data relating to a tradeline;
    parsing, by the computer-based system, the credit reporting data to yield primary debtor data and secondary debtor data;
    linking, by the computer-based system, the tradeline with the primary debtor data and the secondary debtor data; and
    querying, by the computer-based system, a data store containing credit bureau data for a physical address associated with the primary debtor and a physical address associated with the secondary debtor; and
    determining, by the computer-based system, that the primary debtor and the secondary debtor reside at the different physical addresses.

2. The method of claim 1, further comprising marketing to the secondary debtor.

3. The method of claim 2, wherein the marketing is distributed to the primary debtor.

4. The method of claim 1, further comprising marketing to the secondary debtor wherein the marketing is based upon demographic data associated with the physical address of the secondary debtor.

5. The method of claim 1, further comprising marketing to the primary debtor wherein the marketing is based upon demographic data associated with the physical address of the primary debtor.

6. The method of claim 1, further comprising obtaining internal data relating to the primary debtor and the secondary debtor.

7. The method of claim 6, further comprising obtaining internal data relating to the primary debtor and the secondary debtor.

8. The method of claim 7, further comprising analyzing the internal data to determine the spending patterns of the secondary debtor.

9. The method of claim 8, further comprising querying the data store for tradeline data associated with at least one of the primary debtor and the secondary debtor to yield household tradeline data.

10. The method of claim 9, further comprising identifying an installment tradeline in the household tradeline data.

11. A method comprising:
    receiving, at a computer-based system for credit data analysis comprising a processor and a tangible, non-transitory memory, credit reporting data relating to a tradeline;
    parsing, by the computer-based system, the credit reporting data to yield primary debtor data and secondary debtor data, wherein the primary debtor data identifies a primary debtor and wherein the secondary debtor data identifies a secondary debtor, and wherein a debtor entity comprises the primary debtor and the secondary debtor;
    linking, by the computer-based system, the tradeline with the primary debtor data and the secondary debtor data, wherein the linking causes the tradeline to be associated with the primary debtor and the secondary debtor;
    querying, by the computer-based system, a data store containing credit bureau data for a physical address associated with the primary debtor and a physical address associated with the secondary debtor; and
    determining, by the computer-based system, that the primary debtor and the secondary debtor reside at the different physical addresses.

12. The method of claim 11, further comprising marketing to the secondary debtor.

13. The method of claim 12, wherein the marketing is distributed to the primary debtor.

14. The method of claim 11, further comprising marketing to the secondary debtor wherein the marketing is based upon demographic data associated with the physical address of the secondary debtor.

15. The method of claim 11, further comprising marketing to the primary debtor wherein the marketing is based upon demographic data associated with the physical address of the primary debtor.

16. The method of claim 11, further comprising obtaining internal data relating to the primary debtor and the secondary debtor.

17. The method of claim 16, further comprising obtaining internal data relating to the primary debtor and the secondary debtor.

18. The method of claim 17, further comprising analyzing the internal data to determine the spending patterns of the secondary debtor.

19. The method of claim 18, further comprising querying the data store for tradeline data associated with at least one of the primary debtor and the secondary debtor to yield household tradeline data.

20. The method of claim 19, further comprising identifying an installment tradeline in the household tradeline data.

* * * * *